(12) United States Patent
Muchow et al.

(10) Patent No.: US 7,389,332 B1
(45) Date of Patent: Jun. 17, 2008

(54) METHOD AND APPARATUS FOR SUPPORTING COMMUNICATIONS BETWEEN NODES OPERATING IN A MASTER-SLAVE CONFIGURATION

(75) Inventors: James D. Muchow, Zimmerman, MN (US); Mark Bakke, Maple Grove, MN (US)

(73) Assignee: Cisco Technology, Inc., San Jose, CA (US)

(*) Notice: Subject to any disclaimer, the term of this patent is extended or adjusted under 35 U.S.C. 154(b) by 438 days.

(21) Appl. No.: 10/122,401

(22) Filed: Apr. 11, 2002

Related U.S. Application Data

(63) Continuation of application No. 09/949,182, filed on Sep. 7, 2001, now abandoned.

(51) Int. Cl.
*G06F 15/177* (2006.01)

(52) U.S. Cl. .................. 709/220; 709/223; 709/224; 370/254

(58) Field of Classification Search .................. 709/203, 709/208, 223–224, 220, 221, 226; 710/8; 370/254, 473, 252; 714/4, 57; 718/10
See application file for complete search history.

(56) References Cited

U.S. PATENT DOCUMENTS

| | | |
|---|---|---|
| 4,495,617 A | 1/1985 | Ampulski et al. |
| 5,390,326 A | 2/1995 | Shah |
| 5,461,608 A | 10/1995 | Yoshiyama |
| 5,473,599 A | 12/1995 | Li et al. |
| 5,491,812 A | 2/1996 | Pisello et al. |
| 5,535,395 A | 7/1996 | Tipley et al. |
| 5,544,077 A | 8/1996 | Hershey |
| 5,579,491 A | 11/1996 | Jeffries et al. |
| 5,600,828 A | 2/1997 | Johnson et al. |
| 5,642,337 A | 6/1997 | Oskay et al. |
| 5,666,486 A | 9/1997 | Alfieri et al. |
| 5,732,206 A | 3/1998 | Mendel |

(Continued)

OTHER PUBLICATIONS

Gusella, R., et al., "An Election Algorithm for a Distributed Clock Synchronization Program", *CS Technical Report #275*, University of California, Berkeley, (Dec. 1985),pp. 1-14.

(Continued)

*Primary Examiner*—ThuHa Nguyen
(74) *Attorney, Agent, or Firm*—Schwegman, Lundberg & Woessner. P.A.

(57) ABSTRACT

A node (101, FIG. 1), within a networked computer system (100), is capable of supporting communications with other nodes relating to operating multiple application instances in a master-slave configuration. The node initiates (602, FIG. 6) and maintains (FIGS. 7, 8) a state diagram (FIG. 2) for each application instance currently running in the master-slave configuration on the node or the other nodes. In addition, the node listens for new application instances that are discovered on the node or on the other nodes. The nodes can be interconnected using multiple networks (104, FIG. 1), and redundant messages received by the node can be ignored (FIG. 11), if those redundant messages would adversely affect maintenance of the state diagram for an application instance. When a node determines that it should no longer operate as a master for an application instance, the node can initiate a resignation process (FIG. 4), during which another node will attempt to become the master for the application instance.

35 Claims, 12 Drawing Sheets

U.S. PATENT DOCUMENTS

| | | | |
|---|---|---|---|
| 5,812,821 A | 9/1998 | Sugi et al. | |
| 5,832,299 A | 11/1998 | Wooten | |
| 5,850,573 A | 12/1998 | Wada | |
| 5,870,571 A | 2/1999 | Duburcq et al. | |
| 5,909,544 A * | 6/1999 | Anderson, II et al. | 709/208 |
| 5,935,215 A | 8/1999 | Bell et al. | |
| 5,951,683 A | 9/1999 | Yuuki et al. | |
| 5,991,813 A | 11/1999 | Zarrow | |
| 5,996,024 A | 11/1999 | Blumenau | |
| 5,996,027 A | 11/1999 | Volk et al. | |
| 6,006,259 A | 12/1999 | Adelman et al. | |
| 6,009,476 A | 12/1999 | Flory et al. | |
| 6,009,480 A | 12/1999 | Pleso | |
| 6,018,765 A | 1/2000 | Durana et al. | |
| 6,041,381 A | 3/2000 | Hoese | |
| 6,078,957 A | 6/2000 | Adelman et al. | |
| 6,108,300 A | 8/2000 | Coile et al. | |
| 6,108,699 A * | 8/2000 | Moiin | 709/221 |
| 6,131,119 A | 10/2000 | Fukui | |
| 6,134,673 A | 10/2000 | Chrabaszcz | |
| 6,145,019 A * | 11/2000 | Firooz et al. | 710/8 |
| 6,151,297 A | 11/2000 | Congdon et al. | |
| 6,163,855 A | 12/2000 | Shrivastava et al. | |
| 6,178,445 B1 | 1/2001 | Dawkins et al. | |
| 6,185,620 B1 | 2/2001 | Weber et al. | |
| 6,195,687 B1 * | 2/2001 | Greaves et al. | 709/208 |
| 6,195,760 B1 | 2/2001 | Chung et al. | |
| 6,209,023 B1 | 3/2001 | Dimitroff et al. | |
| 6,219,771 B1 | 4/2001 | Kikuchi et al. | |
| 6,268,924 B1 | 7/2001 | Koppolu et al. | |
| 6,269,396 B1 | 7/2001 | Shah et al. | |
| 6,314,526 B1 | 11/2001 | Arendt et al. | |
| 6,327,622 B1 | 12/2001 | Jindal et al. | |
| 6,343,320 B1 * | 1/2002 | Fairchild et al. | 709/224 |
| 6,353,612 B1 | 3/2002 | Zhu et al. | |
| 6,363,416 B1 * | 3/2002 | Naeimi et al. | 709/209 |
| 6,378,025 B1 | 4/2002 | Getty | |
| 6,392,990 B1 | 5/2002 | Tosey et al. | |
| 6,393,583 B1 | 5/2002 | Meth et al. | |
| 6,400,730 B1 | 6/2002 | Latif et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,560,630 B1 | 5/2003 | Vepa et al. | |
| 6,574,755 B1 | 6/2003 | Seon | |
| 6,591,310 B1 | 7/2003 | Johnson | |
| 6,597,956 B1 | 7/2003 | Aziz et al. | |
| 6,640,278 B1 | 10/2003 | Nolan et al. | |
| 6,654,830 B1 | 11/2003 | Taylor et al. | |
| 6,658,459 B1 | 12/2003 | Kwan et al. | |
| 6,665,702 B1 | 12/2003 | Zisapel et al. | |
| 6,678,721 B1 * | 1/2004 | Bell | 709/209 |
| 6,683,883 B1 | 1/2004 | Czeiger et al. | |
| 6,691,244 B1 * | 2/2004 | Kampe et al. | 714/4 |
| 6,697,924 B2 | 2/2004 | Swank | |
| 6,701,449 B1 | 3/2004 | Davis et al. | |
| 6,718,361 B1 * | 4/2004 | Basani et al. | 709/201 |
| 6,718,383 B1 | 4/2004 | Hebert | |
| 6,721,907 B2 * | 4/2004 | Earl | 714/57 |
| 6,724,757 B1 | 4/2004 | Zadikian et al. | |
| 6,728,780 B1 | 4/2004 | Hebert | |
| 6,748,550 B2 | 6/2004 | McBrearty et al. | |
| 6,757,291 B1 | 6/2004 | Hu | |
| 6,760,783 B1 | 7/2004 | Berry | |
| 6,763,195 B1 * | 7/2004 | Willebrand et al. | 398/115 |
| 6,763,419 B2 | 7/2004 | Hoese et al. | |
| 6,766,520 B1 | 7/2004 | Rieschl et al. | |
| 6,771,663 B1 * | 8/2004 | Jha | 370/473 |
| 6,771,673 B1 | 8/2004 | Baum et al. | |
| 6,799,316 B1 | 9/2004 | Aguilar et al. | |
| 6,807,581 B1 | 10/2004 | Starr et al. | |
| 6,823,418 B2 | 11/2004 | Langendorf et al. | |
| 6,839,752 B1 * | 1/2005 | Miller et al. | 709/224 |
| 6,845,403 B2 | 1/2005 | Chadalapaka | |
| 6,856,591 B1 | 2/2005 | Ma et al. | |
| 6,859,462 B1 | 2/2005 | Mahoney et al. | |
| 6,874,147 B1 | 3/2005 | Diamant | |
| 6,877,044 B2 | 4/2005 | Lo et al. | |
| 6,885,633 B1 | 4/2005 | Mikkonen | |
| 6,886,171 B2 | 4/2005 | MacLeod | |
| 6,889,338 B2 | 5/2005 | Srinivasan et al. | |
| 6,895,461 B1 | 5/2005 | Thompson | |
| 6,920,491 B2 | 7/2005 | Kim | |
| 6,922,743 B2 | 7/2005 | Mizuno | |
| 6,934,799 B2 | 8/2005 | Acharya et al. | |
| 6,938,092 B2 | 8/2005 | Burns | |
| 6,944,785 B2 | 9/2005 | Gadir et al. | |
| 6,965,934 B1 | 11/2005 | Reynolds et al. | |
| 7,043,727 B2 * | 5/2006 | Bennett et al. | 718/100 |
| 7,165,258 B1 | 1/2007 | Kuik et al. | |
| 7,188,194 B1 | 3/2007 | Kuik et al. | |
| 7,200,610 B1 | 4/2007 | Prawdiuk et al. | |
| 2002/0010750 A1 * | 1/2002 | Baretzki | 709/208 |
| 2002/0023150 A1 | 2/2002 | Osafune et al. | |
| 2002/0042693 A1 * | 4/2002 | Kampe et al. | 702/186 |
| 2002/0049845 A1 * | 4/2002 | Sreenivasan et al. | 709/226 |
| 2002/0055978 A1 | 5/2002 | Joon-Bo et al. | |
| 2002/0059392 A1 * | 5/2002 | Ellis, III | 709/208 |
| 2002/0065872 A1 | 5/2002 | Genske et al. | |
| 2002/0103943 A1 | 8/2002 | Lo et al. | |
| 2002/0116460 A1 * | 8/2002 | Treister et al. | 709/204 |
| 2002/0126680 A1 | 9/2002 | Inagaki et al. | |
| 2002/0156612 A1 | 10/2002 | Schulter et al. | |
| 2002/0178143 A1 | 11/2002 | Fujimoto | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0005068 A1 | 1/2003 | Nickel et al. | |
| 2003/0014462 A1 * | 1/2003 | Bennett et al. | 709/100 |
| 2003/0018813 A1 | 1/2003 | Antes et al. | |
| 2003/0018927 A1 | 1/2003 | Gadir et al. | |
| 2003/0037284 A1 | 2/2003 | Srinivasan et al. | |
| 2003/0058870 A1 | 3/2003 | Mizrachi et al. | |
| 2003/0084209 A1 | 5/2003 | Chadalapaka | |
| 2003/0097607 A1 | 5/2003 | Bessire | |
| 2003/0115447 A1 | 6/2003 | Pham et al. | |
| 2003/0140193 A1 | 7/2003 | Acharya et al. | |
| 2003/0145108 A1 | 7/2003 | Joseph et al. | |
| 2003/0149830 A1 | 8/2003 | Torr et al. | |
| 2003/0182455 A1 | 9/2003 | Hetzler et al. | |
| 2003/0208579 A1 * | 11/2003 | Brady et al. | 709/223 |
| 2003/0210686 A1 | 11/2003 | Terrell et al. | |
| 2004/0024778 A1 | 2/2004 | Cheo | |
| 2004/0064553 A1 | 4/2004 | Kjellberg | |
| 2004/0141468 A1 | 7/2004 | Christensen | |
| 2004/0233910 A1 | 11/2004 | Chen et al. | |
| 2005/0055418 A1 | 3/2005 | Blanc et al. | |
| 2005/0063313 A1 * | 3/2005 | Nanavati et al. | 370/252 |
| 2005/0268151 A1 | 12/2005 | Hunt et al. | |
| 2006/0265529 A1 | 11/2006 | Kuik et al. | |
| 2007/0112931 A1 | 5/2007 | Kuik et al. | |

OTHER PUBLICATIONS

Gusella, R., et al., "The Berkeley UNIX Time Synchronization Protocol", *UNIX Programmers Manual, 4.3 Berkeley Software Distrib.*, vol. 2C, (1986), 10 pages.

Lewis, P., "A High-Availability Cluster for Linux", http://www2.linuxjournal.com/lj-issues/issue64/3247.html, (Apr. 1994), 11 pages.

Knight, S., et al., *Virtual Router Redundancy Protocol*, Network Working Group, RFC 2338, obtained from http://www.search.ietf.org/rfc/rfc2338.txt, (1998), 26 p.

Li, T., et al., *Cisco Hot Standby Router Protocol (HSRP)*, Network Working Group, RFC 2281, obtained from http://www.search.ietf.org/rfc/rfc2281.txt,(1998), 16 p.

Meth, K. Z., et al., "Design of the iSCSI protocol", *Proceedings of the 20th IEEE Conference on Mass Storage Systems and Technologies*, (Apr. 7-10, 2003), 116-122.

Moore, K., *On the Use of HTTP as a Substrate*, Network Working Group, RFC 3205, obrtained from http://www.search.ietf.org/rfc/rfc3205.txt,(2002), 14 p.

Satran, J., et al., *iSCSI*, IPS Internet Draft, draft-ietf-ips-iSCSI-12.txt, Category: standards—track,(Apr. 17, 2002),260 p.

Simitci, H., et al., "Evaluation of SCSP over TCP/IP and SCSI over fibre channel connections", *Hot Interconnects, 9,* (Aug. 2001),87-91.

*VMware ESX Server: User's Manual*, Version 1.0, obtained from http://web. archive.org/web/20010608201203/www.vmware.com/support,(Jun. 6, 2001), 122-124.

"U.S. Appl. No. 10/094,552, Response filed Apr. 21, 2006 to Non Final Office Action mailed Nov. 21, 2005", 6 pgs.

"U.S. Appl. No. 10/094,552, Response filed Oct. 12, 2006 to Final Office Action mailed Jul. 12, 2006", 14 pgs.

"U.S. Appl. No. 10/094,552, Amendment and Response filed Aug. 4, 2005 to Office Action mailed May 4, 2005", 14 pgs.

"U.S. Appl. No. 10/094,552, Final Office Action mailed Jul. 12, 2006", 20 pgs.

"U.S. Appl. No. 10/094,552, Non Final Office Action mailed May 4, 2005", 16 pgs.

"U.S. Appl. No. 10/094,552, Non Final Office Action mailed Nov. 21, 2005", 18 pgs.

"U.S. Appl. No. 10/094,552, Notice of Allowance mailed Jan. 31, 2007", 12 pgs.

"U.S. Appl. No. 10/094,552, Notice of Allowance mailed Sep. 13, 2007", 7 p.

"U.S. Appl. No. 10/128,657, Amendment and Response filed Jan. 8, 2007 to Office Action mailed Aug. 8, 2006", 14 pgs.

"U.S. Appl. No. 10/128,657, Amendment and Response filed May 19, 2006 to Office Action mailed Dec. 19, 2005", 13 pgs.

"U.S. Appl. No. 10/128,657, Amendment and Response filed Sep. 16, 2005 to Office Action mailed May 16, 2005", 15 pgs.

"U.S. Appl. No. 10/128,657, Final Office Action mailed Aug. 8, 2006", 16 pgs.

"U.S. Appl. No. 10/128,657, Non-Final Office Action mailed Dec. 19, 2005", 19 pgs.

"U.S. Appl. No. 10/128,657, Non-Final Office Action mailed Apr. 4, 2007", 16 pgs.

"U.S. Appl. No. 10/128,657, Non-Final Office Action mailed May 16, 2005", 25 pgs.

"U.S. Appl. No. 10/128,657, Response filed Aug. 6, 2007 to Office Action mailed Apr. 4, 2007", 13 p.

"U.S. Appl. No. 10/128,657, Supplemental Amendment filed Oct. 4, 2007", 12 p.

"U.S. Appl. No. 10/131,274, Amendment and Response mailed Oct. 3, 2005", 17 pgs.

"U.S. Appl. No. 10/131,274, Advisory Action mailed Mar. 30, 2006", 6 pgs.

"U.S. Appl. No. 10/131,274, Amendment and Response filed Mar. 6, 2006 to Final Office Action mailed Dec. 6, 2005", 12 pgs.

"U.S. Appl. No. 10/131,274, Amendment and Response filed Mar. 6, 2007 to Office Action mailed Oct. 6, 2006", 14 pgs.

"U.S. Appl. No. 10/131,274, Amendment and Response filed Jul. 6, 2006 to Final Office Action mailed Dec. 6, 2005", 19 pgs.

"U.S. Appl. No. 10/131,274, Final Office Action mailed Dec. 6, 2005", 13 pgs.

"U.S. Appl. No. 10/131,274, Final Office Action mailed May 18, 2007", 14 pgs.

"U.S. Appl. No. 10/131,274, Non-Final Office Action mailed Oct. 6, 2006 in", 11 pgs.

"U.S. Appl. No. 10/131,274, Non-Final Office Action mailed Jun. 1, 2005", 11 pgs.

"U.S. Appl. No. 10/131,274, Notice of Panel Decision from Pre-Appeal Brief Review mailed Apr. 25, 2006", 2 pgs.

"U.S. Appl. No. 10/131,274, Pre-Appeal Brief Request for Review mailed Apr. 6, 2006", 10 pgs.

"U.S. Appl. No. 10/131,274, Response filed Aug. 20, 2007 to Final Office Action mailed May 18, 2007", 12 p.

"U.S. Appl. No. 10/131,274, Non-Final Office Action mailed Sep. 27, 2007", 11 p.

"U.S. Appl. No. 10/131,275, Request for Continued Examination and Amendment and Response mailed Jan. 26, 2007", 22 pgs.

"U.S. Appl. No. 10/131,275, Non-Final Office Action mailed Apr. 19, 2007", 11 pgs.

"U.S. Appl. No. 10/131,275, Final Office Action mailed Sep. 28, 2006", 16 pgs.

"U.S. Appl. No. 10/131,275, Non Final Office Action mailed Feb. 24, 2006", 13 pgs.

"U.S. Appl. No. 10/131,275, Response filed Jun. 26, 2006 to Non Final Office Action mailed Feb. 24, 2006", 19 pgs.

"U.S. Appl. No. 10/131,275, Response filed Aug. 17, 2007 to Final Office Action mailed Apr. 19, 2007", 19 p.

"U.S. Appl. No. 11/748,966, Supplemental Preliminary Amendment filed Jul. 3, 2007", 12 p.

Bakker, G., *IP Aliasing*, obtained from http://www.zone-h.org/files/24/ip_aliasing.txt,(1999),3 pgs.

Satran, J., et al., "iSCSI", *IPS Internet Draft, draft-ietf-ips-iSCSI-00, Category: Standards Track*, Retrieved from the Internet: <URL: http://www.haifa.il.ilb.com/satran/ips/draft-ietf-ips-iSCSI-00.txt>,(Nov. 2000),78 pgs.

US 7,231,429, 06/2007, Muchow (withdrawn)

\* cited by examiner

| | APPLICATION TYPE ⟵502 | APPLICATION ID ⟵504 | CURRENT STATE ⟵506 | STATE TIMER VALUE ⟵508 |
|---|---|---|---|---|
| 510 ⟶ | 433 | 1037 | MASTER | 2 |
| 512 ⟶ | 433 | 1234 | SLAVE | 12 |
| 514 ⟶ | 433 | 4578 | CANDIDATE | 6 |
| 516 ⟶ | 856 | 3296 | MASTER | 2 |
| 518 ⟶ | 763 | 1037 | RESIGNATION | 0 |
| | 763 | 9876 | MASTER | 2 |
| | -- | -- | NULL | 5 |

| | 552 | 554 | 556 | 558 | 560 |
|---|---|---|---|---|---|
| | CLUSTER ID | APPLICATION TYPE | APPLICATION ID | CURRENT STATE | STATE TIMER VALUE |
| 562 | 612 | 433 | 1037 | MASTER | 2 |
| 564 | 612 | 433 | 1234 | SLAVE | 12 |
| 566 | 612 | 433 | 4578 | CANDIDATE | 6 |
| 568 | 612 | 856 | 3296 | MASTER | 2 |
| | 612 | 856 | 1234 | MASTER | 2 |
| | 612 | — | — | NULL | 5 |
| 570 | 507 | 433 | 1037 | MASTER | 10 |
| 572 | 507 | 433 | 1234 | MASTER | 10 |
| 574 | 507 | 856 | 3296 | MASTER | 10 |
| 576 | 507 | 763 | 1037 | RESIGNATION | 0 |
| | 507 | 763 | 9876 | MASTER | 10 |
| 578 | 507 | — | — | NULL | 4 |

METHOD AND APPARATUS FOR SUPPORTING COMMUNICATIONS BETWEEN NODES OPERATING IN A MASTER-SLAVE CONFIGURATION

CROSS-REFERENCE TO RELATED APPLICATION

This application is a continuation of U.S. patent application Ser. No. 09/949,182, filed Sep. 7, 2001, now abandoned which is incorporated herein by reference.

TECHNICAL FIELD OF THE INVENTION

The present invention relates generally to methods for managing execution of multiple applications within a networked, multi-processor system, and more specifically, methods for managing communications between multiple, networked nodes, which execute applications using a master-slave configuration.

BACKGROUND OF THE INVENTION

In a multi-processor computer network, some applications are executed using a master-slave configuration. In such a system, one computer acts as a master computer, collecting information and/or performing important computational tasks. The slave computers may compute and send information to the master computer, or merely remain available to take over the master tasks, if the master is unable to perform them.

For example, the programs timed and TEMPO are local area network clock synchronizers, which are executed using a master-slave configuration. In both of these programs, each slave executes a time daemon (i.e., a task or application program that runs continuously), which periodically sends a message to the master. The time messages include each slave's concept of the network time. Another time daemon, executed by the master, computes the network time as an average of the times provided by non-faulty clocks, and sends to each slave time daemon a correction that the slave time daemon should perform on the clock of its machine.

The "Time Synchronization Protocol" (TSP) is used by the programs timed and TEMPO to support clock synchronization messages, as is described in detail in "The Berkeley UNIX Time Synchronization Protocol," Gusella, et al. (1986). In general, all the communication occurring among the time daemons uses the TSP protocol. The message format in TSP is 8-bit-byte oriented, and is the same for all message types. The structure of each TSP message is as follows:

1) A one byte message type;
2) A one byte version number, specifying the protocol version which the message uses;
3) A two byte sequence number to be used for recognizing duplicate messages that occur when messages are retransmitted;
4) Eight bytes of packet specific data. This field contains two 4 byte time values, a one byte hop count, or may be unused depending on the type of the packet; and
5) A zero-terminated string of up to 256 ASCII characters with the identity of the machine sending the message.

TSP also supports messages for the election that occurs among slave time daemons when, for any reason, the master disappears, as is described in detail in "An Election Algorithm for a Distributed Clock Synchronization Program," Gusella et al. (December 1985). Basically, the election process chooses a new master from among the available slaves when the original master ceases to function properly.

When started up, each slave time daemon randomly selects a value for an "election timer" from a predefined range. When the master time daemon is working, it periodically resets each slave time daemon's election timer by sending out a synchronization message. If a slave does not receive a synchronization message before its election timer expires, improper functioning of the master is assumed. Accordingly, the slave whose election timer expires first will become a candidate to become the new master. If the candidate slave is elected, it will become the new master and will assume responsibility for synchronizing the network's remaining clocks.

The rate that the synchronization messages are sent out using TSP is very slow (e.g., on the order of once every several minutes). Therefore, if the master does fail, it may take several minutes for a slave to respond and conduct an election. This characteristic of TSP can result in an unacceptably slow assumption of master tasks.

The TSP protocol functions well in the context of supporting messages and elections that occur as part of a clock synchronization program. However, its portability to other types of applications is limited, and it is not well adapted to inclusion in modern systems for several reasons.

In modern networked computer systems, each machine may be capable of simultaneously running multiple tasks and applications, each of which is executed using a master-slave configuration. In addition, modern CPUs more efficiently process messages that have 32-bit message formats. The primary limitation of TSP's application to modern systems is that TSP is capable of supporting message transfer for only a single daemon (e.g., a time daemon) per machine. In addition, TSP is not adapted to work in an environment where multiple, redundant networks are available to interconnect nodes. Finally, the TSP message format is byte oriented, and is less efficient with modern CPUs. Therefore, TSP is not an acceptable protocol for providing messaging and election capabilities for modern networked computer systems.

What is needed is a protocol and method that can rapidly respond to a master failure (e.g., within less than a second). Also needed is a protocol and method that can support messaging and elections for multiple tasks and applications running on each node of a networked computer system. In addition, what is needed is a protocol and method that support 32-bit message formats, which better utilizes the advanced capabilities of modern CPUs. Further needed is a protocol and method that can be used in the context of redundant networks.

BRIEF DESCRIPTION OF THE DRAWING

FIG. 5A is an example of an application instance state table in accordance with one embodiment of the present invention;

FIG. 5B is an example of an application instance state table, which includes cluster identifiers, in accordance with another embodiment of the present invention;

DETAILED DESCRIPTION OF THE INVENTION

Various embodiments of the present invention provide methods for operating a node, within a networked computer system, which is capable of supporting communications with other nodes relating to operating multiple application instances in a master-slave configuration. The node maintains a state diagram for each application instance currently running in the master-slave configuration on the node and on the other nodes. In addition, the node listens for new application instances that are discovered on the node and on the other nodes. The nodes can be interconnected using multiple networks, and redundant messages received by the node can be ignored, because no redundant messages would adversely affect maintenance of the state diagram for an application instance. When a node determines that it should no longer operate as a master for an application instance, the node can initiate a resignation process, during which another node will attempt to become the master for the application instance.

Figure 1:
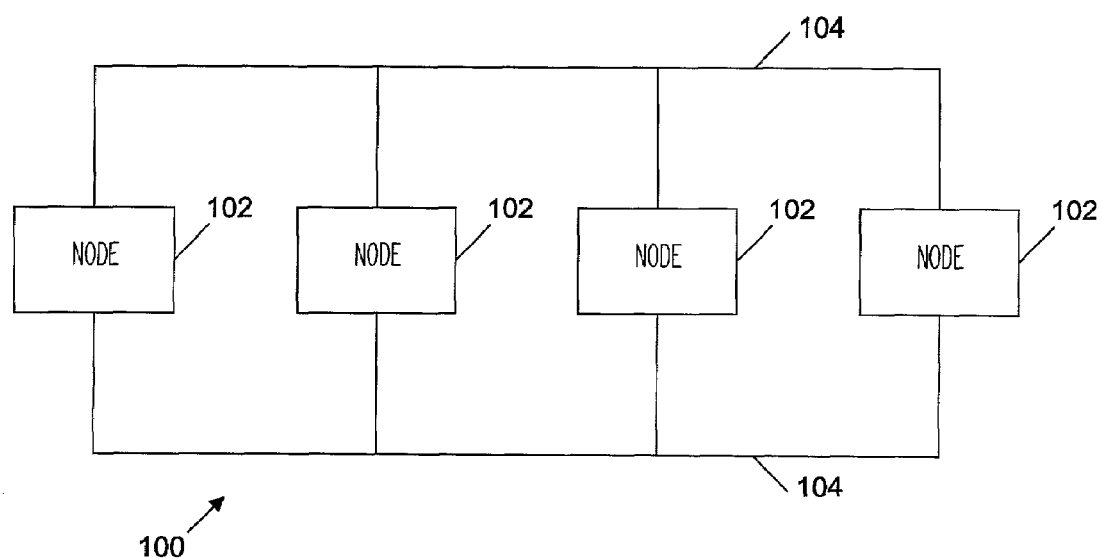
FIG. 1 illustrates a typical computer system within which the various embodiments of the present invention can be practiced.

FIG. 1 illustrates a typical computer system 100 within which the various embodiments of the present invention can be practiced. System 100 includes multiple nodes 102 interconnected by one or more communication networks 104. A "node," as used herein, refers to a distinct processing element of a computer system, which could be co-located with or remote from other nodes of the computer system. For example, some or all of the multiple nodes 102 could be stand-alone computers within a networked computer system. Alternatively, some or all of the multiple nodes 102 could be processors that are co-located within a single computer or facility, and which are networked together.

Although FIG. 1 illustrates four nodes 102 and two networks 104, a system could include more or fewer nodes interconnected by more or fewer networks 104. An advantage to interconnecting nodes 102 using multiple networks is that it provides hardware redundancy. This means that, if one network fails for any reason, nodes 102 still can communicate using the remaining one or more functioning networks.

Messages relating to operating in the master-slave configuration are referred to herein as "master-slave messages." In one embodiment, each node 102 sends some or all master-slave messages over multiple networks 104. Accordingly, each node 102 receives master-slave messages on multiple networks 104. Therefore, this hardware redundancy has the side effect that each node must be able to deal with redundant messages without operating improperly. In one embodiment, redundant message handling capabilities are built into the system, as will be described in detail in conjunction with FIGS. 2 and 11.

Networks 104 could be any of various types of networks. For example, some or all networks 104 could be Ethernet links, DSL systems, telephone systems, the Internet, or combinations of these or other types of networks. In one embodiment, some or all of networks 104 are "bus" type networks, where each node connects to a single communication link. In bus type networks, when a node places a message on the network 104, the node 102 essentially "broadcasts" the message to all other nodes on the network 104. In another embodiment, some or all of networks 104 could be point-to-point networks, where message broadcasting is simulated.

Each node 102 includes one or more processors and one or more external network interfaces (e.g., ports). Each network interface allows a node 102 to send and receive messages from an external network 104. For example, a particular network interface could be an Ethernet port, fast Ethernet port, DSL port, or cable modem. In one embodiment, each network interface is a TCP/IP network interface, although other types of interfaces could be used, in other embodiments.

Each node 102 may be capable of running one or more different types of applications. In one embodiment, an application type can be virtually any type of software program that is executed using a master-slave configuration. For example, application types can include routers (e.g., IP and SCSI routers), login tasks, time synchronization tasks, and many other types of applications.

Some types of applications can initiate multiple "instances" of themselves on the same node, where an "application instance" is defined herein as a separately executable instance of a particular application type. An application instance can be, for example, a daemon, task, application program, or other type of software program that is executed by the node. For example, if a node is running an IP router, the node may simultaneously execute multiple instances of the router, where each instance is responsible for routing data between different destinations.

A node 102 that is primarily responsible for (i.e., actually "running") an application instance is considered a "master" for that application instance, and all other nodes 102 are considered "slaves" (or "backups") for that application instance. Any node 102 could be a master for one or more application instances, and/or a slave for one or more other application instances.

During steady state operations, only one master is present in the network for any particular application instance, and only the master actually executes the application instance's central task. The slaves, on the other hand, do not execute the application instance's central task, but are available to perform peripheral tasks and/or to take over the execution in the event that the master fails or resigns, for any reason. This situation is referred to as a "fail over," where one of the slaves becomes the master for a particular application instance.

In one embodiment, during steady state operations, each node is aware of all application instances being executed in the network. Each node executes a task for those of the application instances that the node is a master or a slave. For convenience, this task is referred to as a "main master-slave task" or "main task," although the term "task" is not meant to imply that the various embodiments are limited to use in any particular operating system. For the purposes of brevity and ease of description, the term "application instance" means any node function, operating system function, application or application instance whose communications relating to master-slave operation are being managed by a main task.

For each application instance, the main master-slave task on each node coordinates the transfer of state-related and "Heartbeat" messages between nodes, and also manages state transitions (e.g., master-to-slave, slave-to-candidate, etc.) in accordance with a defined state diagram.

Figure 2:
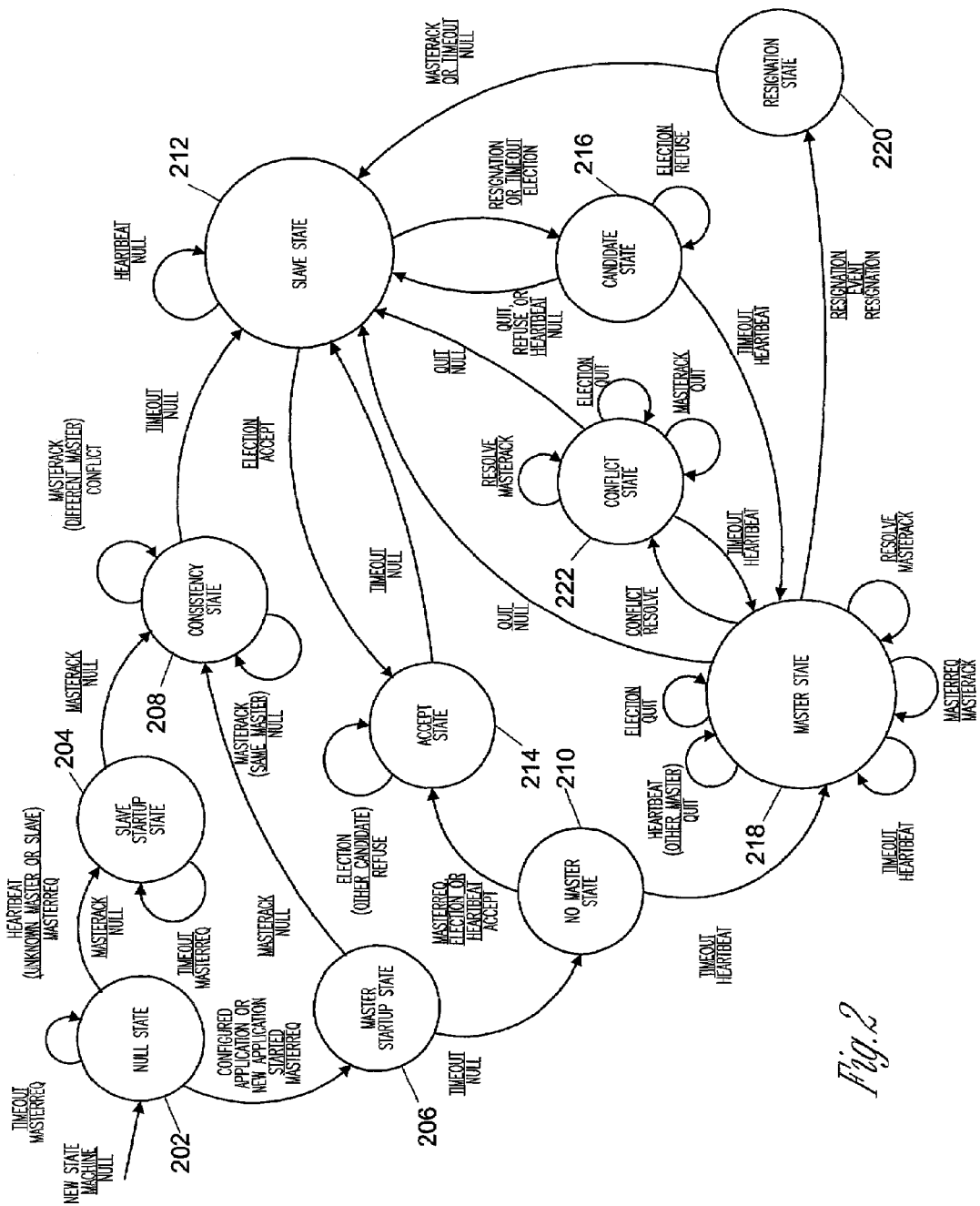
FIG. 2 illustrates a state diagram for a main master-slave task in accordance with one embodiment of the present invention.

FIG. 2 illustrates a state diagram for a main master-slave task in accordance with one embodiment of the present invention. In the figure, circles represent states, and arrows represent transitions. A transition may occur either upon the arrival of a message, the expiration of a timer, or the occurrence of some other event. These transition events are shown on the upper part of the labels superimposed on the arrows. The lower part of each label shows the message that the protocol sends at the time of the corresponding transition. A "null" label signifies that no message is sent or received. An arrow that loops back to the same state from which it originated signifies that no state transition is performed upon the occurrence of a particular event.

As will be evident from the description below, the embodiments of the present invention have several differences from and provide several advantages over the prior art TSP protocol. For example, the embodiments of the present invention are capable of managing execution of multiple application instances on the network's nodes, rather than simply managing a single time daemon on each node, as is performed by the prior art TSP protocol.

Basically, this is achieved by having each node maintain a state machine for each application instance for which the node is in a master state, a slave state, or another state. Other distinctions between the embodiments of the present invention and the prior art will be pointed out, below, in conjunction with the description of each state.

Null State (State 202)

The Null State 202 is entered whenever a new state machine is initiated. A first state machine is initiated upon initialization (i.e., boot up) of the node. As will be described in more detail below, additional state machines are initiated for each configured application that is started manually or automatically upon boot up, and for each application instance running on another node that is detected by the node.

When the first state machine is initiated and enters the Null State 202, several things occur. First, a timeout period timer is initialized. Timeout period timers, referred to simply as "state timers," below, are associated with each of the various states, and each timer indicates how long before the node, for each application instance, should perform a particular action or move to another state, absent some other transition or event. In one embodiment, each state can have a different timeout period from the other states, or each state's timeout period can change from one initialization to another. In other embodiments, the timeout period can be pre-defined and/or specified manually by a user at a console, or can be adjusted based on various system parameters.

While in the Null State 202, the node listens for "Heartbeat" messages from other nodes, indicating that the other nodes are masters and/or slaves for various application instances. In addition, the node initially sends out a Master Request (MasterReq) message over the network (or networks). The node also sends out a MasterReq message upon each expiration of the timeout period. The MasterReq message is intended to ask other nodes whether they are operating as a master for any application instances. If the node receives a Heartbeat message or a Master Acknowledgement (MasterAck) message from any node, indicating that another node is operating as a master for one or more application instances, then the state machine transitions to the Slave Startup State 204 for each of those application instances, which will be described in more detail below. If the node receives no Heartbeat message or MasterAck message within the timeout period, then the node remains in the Null State 202, reinitializes the timeout period timer, and continues to send out MasterReq messages. Once the node has discovered an application on the network, the node will not send out the MasterReq message anymore, in one embodiment.

In one embodiment, the node always has at least one state machine in the Null State 202, and that state machine is waiting to discover new application instances within the other nodes of the network. This state machine is referred to herein as an "idle state machine," indicating that it is idling until a new application instance is discovered.

The inclusion of the idle state machine in this embodiment provides an advantage over the prior art TSP protocol. The TSP protocol assumes that only one type of application instance exists within the node and within the other networked nodes (i.e., a time synchronization application). Accordingly, the TSP protocol promptly enters either the master state or slave state upon initiation of the application, and only one master or slave state machine is maintained by a node at any one time. The TSP protocol is incapable of managing multiple application instances on the nodes, or listening for new application instances on the network. In contrast, this embodiment of the present invention always has one or more state machines in the Null State 202, and so it can provide a new state machine whenever a new application instance is started in the node or is discovered in another node through the receipt of a MasterAck or Heartbeat message from that other node.

Slave Startup State (State 204)

The Slave Startup State 204 is entered from the Null State 202 when the node receives a Heartbeat or MasterAck message from another node, indicating that that other node is a master of an application instance that the node was not earlier aware of. If the node entered the Slave Startup State 204 in response to a Heartbeat message, the node sends out a MasterReq message, in an attempt to contact the master node for the application instance that the Heartbeat was received for.

If the node entered the Slave Startup State 204 in response to a MasterAck message, or if a MasterAck message is received before the expiration of a timeout period, then a transition occurs to the Consistency State 208, which will be described in more detail below. The node will then manage state transitions for that particular application instance, and a new, idle state diagram is initiated (i.e., started up in the Null State 202) to listen for other, new application instances on the network.

If no MasterAck message is received before the expiration of the timeout period, then it is assumed that there is no known master associated with the Heartbeat message, and the node remains in the Slave Startup State 204, periodically sending out MasterReq messages.

The Slave Startup State 204 enables this embodiment of the present invention to listen to the network and acquire every configured application instance that is active on the network. As will be described in more detail below, this enables the node to identify which other nodes can be failover candidates when a master application instance fails in the node, and also enables the node to identify master application instances on other nodes, so that the node can be a failover candidate for those other nodes.

Master Startup State (State 206)

The Master Startup State 206 is entered from the Null State 202 for each configured application that is automatically or manually initiated on the node. In other words, for each configured application and each application instance that is started after boot up (e.g., manually by a user at a console, or automatically in response to some event), a state machine is initiated, and that state machine enters the Master Startup State 206. Once in the Master Startup State 206, the node sends out a MasterReq message, in an attempt to determine whether a master already exists for the configured application instance.

If a MasterAck message is received before the expiration of a timeout period, then a transition occurs to the Consistency State 208, which will be described in more detail below. The node will then manage state transitions for that particular application instance, and a new, idle state diagram is initiated to listen for other, new application instances on the network.

If no MasterAck message is received before the expiration of the timeout period, then it is assumed that there is no known master associated with the application instance, and a transition occurs to the No Master State 210, as will be described below.

Consistency State (State 208)

The Consistency State 208 is entered from the Slave Startup State 204 or the Master Startup State 206. Before entering the Consistency State 208, the node should have received a MasterAck message from another node for a particular application instance. While in the Consistency State 208, the node waits for a timeout period to make certain that no other node is acting as a master for that application instance. During the timeout period, if the node receives a MasterAck message from a node identified in the previous MasterAck message, nothing happens. If the node receives a MasterAck message from another node, the node sends a Conflict message to the first identified master node. The Conflict message enables the first identified master node to work with the second identified master node to eliminate the anomalous condition. If no MasterAck message is received from another node during the timeout period, then the node transitions to the Slave State 212.

No Master State (State 210)

The No Master State 210 is entered from the Master Startup State 206, after it is determined that no other master exists for a particular application instance. The No Master State 210 is intended to handle cases where the state diagram will not transition to the Master State 218, but will instead transition to the Accept State 214. The Master State 218 and the Accept State 214 are described in more detail below.

The state diagram will send out an Accept message and transition to the Accept State 214 if, during a timeout period, the node receives an Election message, described below, from another node that is acting as a slave for the particular application instance. If an Election message is not received within the timeout period, then the node sends out a Heartbeat message, and the state diagram transitions to the Master State 218.

Slave State (State 212)

The Slave State 212 is entered from the Consistency State 208 or the Accept State 214, when a known master exists elsewhere on the network. The Slave State 212 is a stable state, meaning that if the associated application instance, the node, and the network are in a steady state (e.g., the node continues to receive Heartbeats from the master for the application instance), then the node remains in the Slave State 212 for the duration of application instance.

Normally, a master of an application instance periodically sends out a Heartbeat message, which indicates that the master is functioning properly, and is able to continue serving as the master for the application instance. Consequently, each node in the Slave State 212 for the application instance expects to receive a Heartbeat message on a roughly periodic basis, as well. If a node in the Slave State 212 does not receive a Heartbeat message within a timeout period, as indicated by a slave state timer, the node assumes that the master has malfunctioned in some way. Each time the node receives a Heartbeat message from the master, the slave state timer is reset, and the node remains in the Slave State 212 for the application instance.

If the node does not receive a Heartbeat message within the timeout period, then the node assumes that the master has malfunctioned. At that time, the state diagram transitions to the Candidate State 216, and initiates an election process to try to become the new master for the application instance. The node may also transition to the Candidate State 216 and initiate an election if the node receives a Resignation message from the master, indicating that the master wants to relinquish its status as master. As will be described later in conjunction with the Candidate State 216, if the slave fails to win the election, it returns to the Slave State 212. Otherwise, it enters the Master State 218.

While in the Slave State 212, the node also could receive an Election message from another slave that is trying to become the master for the particular application instance. If this occurs, the node sends an Accept message, and the state diagram transitions to the Accept State 214, described below.

The timeout period of the Slave State is defined, in one embodiment, as a multiple of the timeout period used to send a Heartbeat message. In doing so, the occasional loss of a Heartbeat message will not cause a Slave State timeout. In other embodiments, the timeout period could be some value other than a multiple of the timeout period used to send a Heartbeat message.

Furthermore, in one embodiment, when the Slave State timer is reset upon the arrival of a Heartbeat message, a new Slave State timeout period value is selected. In one embodiment, the new Slave State timeout period is selected as a minimum value plus a random (or semi-random) value. For example, the new Slave State timeout period could be selected as a minimum value of one (or multiple) Heartbeat timeout period plus a value within a range of 1-100 Heartbeat timeout periods, although other minimum values and/or ranges could be used as well. In another embodiment, the Slave State timeout period selection process is not random. Desirably, the selection process results in a high probability that the various nodes in the Slave State for the same application instance will not timeout at the same time. Because one slave is likely to timeout before any other slave times out, the use of a variable timeout period is likely to speed up any election process which may occur by limiting the number of candidates, preferably to only one.

Accept State (State 214)

The Accept State 214 is used, in part, to facilitate conduction of an election over the network. The Accept State 214 is entered from the No Master State 210 or from the Slave State 212 when an election is taking place on the network, as indicated by an Election message from a candidate node. During the Accept State 214, the node will not attempt to become a master. In other words, the node "accepts" the fact that another node is attempting to become a master. If, during a timeout period, the node receives an Election message from another candidate, the node sends a Refuse message. After the timeout period expires, a transition to the Slave State 212 occurs.

Candidate State (State 216)

The Candidate State 216 is entered from the Slave State 212 when the node receives a Resignation message from a master, or when a master's Heartbeat has not been received within the slave state timeout period. Either way, the node sends out an Election message, which institutes an election process. During the election process, the node attempts to become the new master of the application instance.

Figure 3:
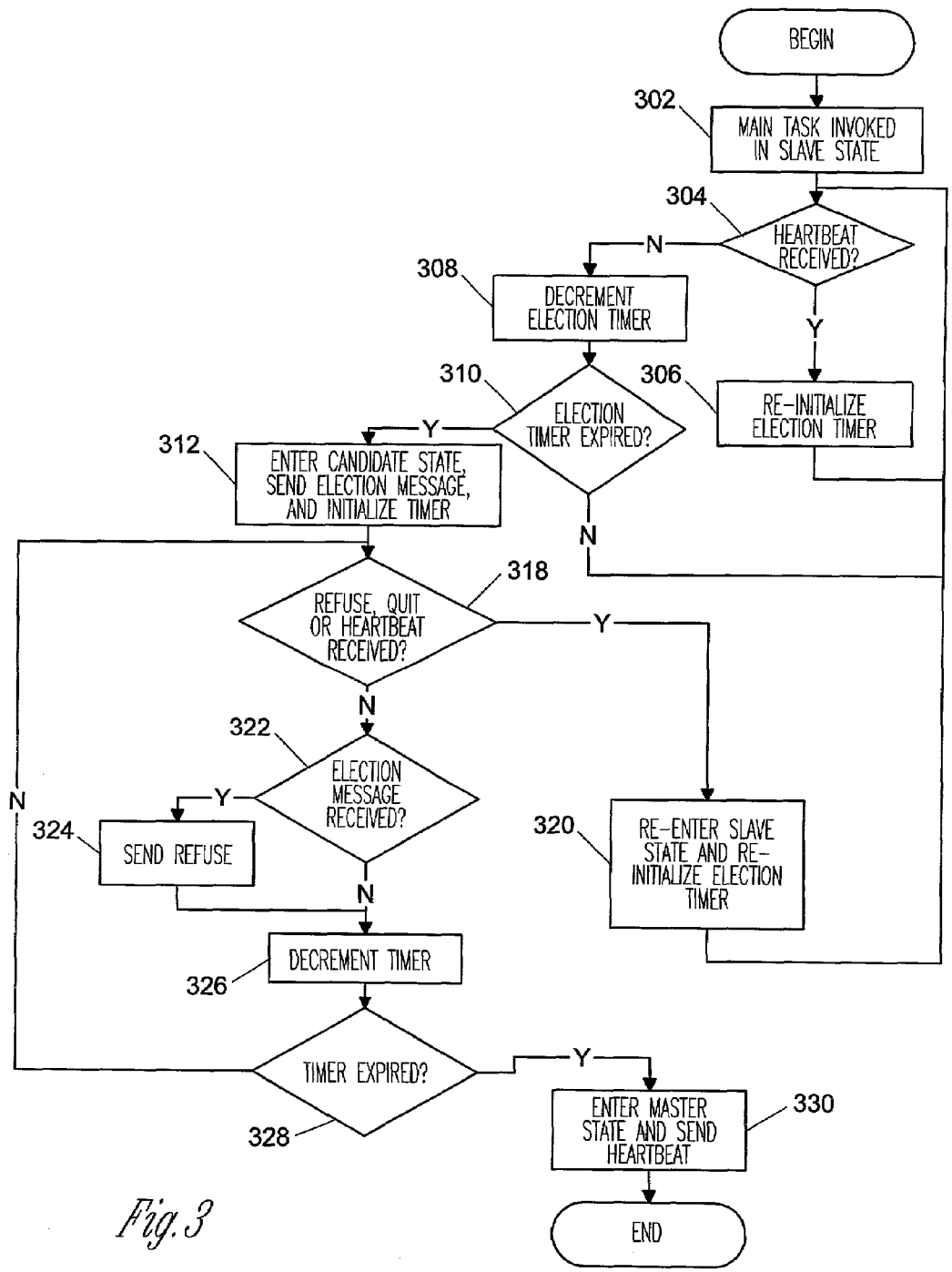
FIG. 3 illustrates a flowchart of a method for a slave to initiate and conduct an election in accordance with one embodiment of the present invention.

FIG. 3 illustrates a flowchart of a method for a slave to initiate and conduct an election in accordance with one embodiment of the present invention. In one embodiment, the method is performed by the main master-slave task. Blocks 302-310 represent processes that occur while the node is in the Slave State (212, FIG. 2), and blocks 312-328 represent processes that occur while the node is in the Candidate State (216, FIG. 2).

The method begins, in block 302, after the main task has been invoked and the node is in the Slave State for an application instance. The main task could be invoked periodically or also upon the receipt of a message. Therefore, a determination is made, in block 304, whether a Heartbeat message has been received from another node that is operating as the master for the application instance. If a Heartbeat message has been received, the main task re-initializes the Slave State election timer for the application instance, in block 306.

If a Heartbeat message has not been received, and the main task has been invoked at a periodic interval, the main task decrements the Slave State election timer, in block 308, and determines, in block 310, whether the election timer has expired. If the election timer has not expired, the method iterates as shown. If the election timer has expired, the node enters the Candidate State (216, FIG. 2), in block 312. When entering the Candidate State, the node broadcasts an Election message, and initializes a Candidate State timer, which indicates how long the node should stay in the Candidate State.

Occasionally, the main task may be invoked before expiration of the Candidate State timer. When invoked, the main task determines, in block 318, whether the node has received a Refuse message, a Quit message, or Heartbeat message from another node that has entered the Master State for the application instance.

If the node has received a Quit or Heartbeat message from another node, it indicates that the other node is already operating as master for that application instance. Similarly, if the node receives a Refuse message from another node, it indicates that another node has previously called an election, and is attempting to become master for the application instance. In these cases, the node re-enters the Slave State, in block 320, re-initializes the election timer, and the method iterates as shown.

If a Refuse, Quit or Heartbeat message has not been received, the main task determines, in block 322, whether an Election message has been received from another node during the timeout period. If so, the node sends a Refuse message to the other node, in block 324, causing the other node to return to its Slave State 212 for the application instance.

If an Election message has not been received, and the main task has been invoked at a periodic interval, the main task decrements the Candidate State timer, in block 326. The main task then determines, in block 328, whether the timer has expired. If not, the procedure iterates as shown. If the timer has expired, the node enters the Master State for the application instance, in block 330, sends out a Heartbeat message, and the method ends.

Master State (State 218)

Referring back to FIG. 2, the Master State 218 typically is entered from the No Master State 210 or the Candidate State 216 when no other master is found for an application instance or when the node, after being a slave for the application instance, has won an election to become master. Similar to the Slave State 212, the Master State 218 is a stable state, meaning that if the associated application instance, the node, and the network are in a steady state, then the node remains in the Master State 218 for the life of the application instance.

While in the Master State 218, the node periodically transmits (e.g., upon expiration of a state timer) Heartbeat messages over one or more of the networks to which the node is attached. The Heartbeat message indicates that the node is operating properly with respect to the application instance.

In one embodiment, the nodes alternate to which network the Heartbeat message is sent out on, assuming the node is connected to more than one network. This reduces the amount of traffic going out on a single network. In other words, a single network is not responsible for bearing all of the Heartbeat message traffic. In another embodiment, the node could send the Heartbeat messages out over one particular network without alternating. Alternatively, the node could send them out over more than one network at a time.

The node can transition out of the Master State 218 for several reasons: 1) the node receives a Quit message from another master; 2) the node detects a Conflict message from another node; or 3) a failure of the application instance or the node is imminent or has occurred. Each of these cases are discussed below.

If the node receives a Quit message from another node, it means that some other node is operating as the master for the application instance. A state transition then occurs directly to the Slave State 212, and the node then acts as a slave for the application instance.

While in the Master State 218, if the node receives a Conflict message, the node sends out a Resolve message, and a transition to the Conflict State 222 occurs. A Conflict message indicates that one or more other nodes are attempting to act the master for the application instance. The node broadcasts the Resolve message to determine the identity of the other master, so that the node can force the other node into the Slave State. As will be described in conjunction with the Conflict State 222, described below, if the node successfully forces the other master into the Slave State, then a transition back to the Master State 218 occurs. Otherwise, the node becomes a slave for the application instance.

The node also may transition out of the Master State 218 if the application instance, application, or node is or soon will be operating improperly. In one embodiment, a monitor task, described later, periodically checks to see how the various application instances in the master state are running. The application instance health is indicated by criteria that the application instance provided upon registering itself. If the application instance is not running properly according to the criteria, or some other resignation event occurs, the monitor task sends a message to the main master-slave task. The main task then causes the node to send out a Resignation message, and a state transition to the Resignation State 220 occurs, as will be described in more detail below.

The node may respond to several other messages while in the Master State 218. First, if the node receives a Heartbeat message or an Election message from another node that is operating as a master or attempting to become a master of the application instance, the node sends a Quit message to that other node, in an attempt to force the other node into the Slave State. In addition, if the node receives a MasterReq message from another node, the node sends a MasterAck message that identifies the node to the other node. Finally, if the node receives a Resolve message from another node, the node sends a MasterAck message, indicating that the node considers itself to be the master for the application instance.

Resignation State (State 220)

Figure 4:
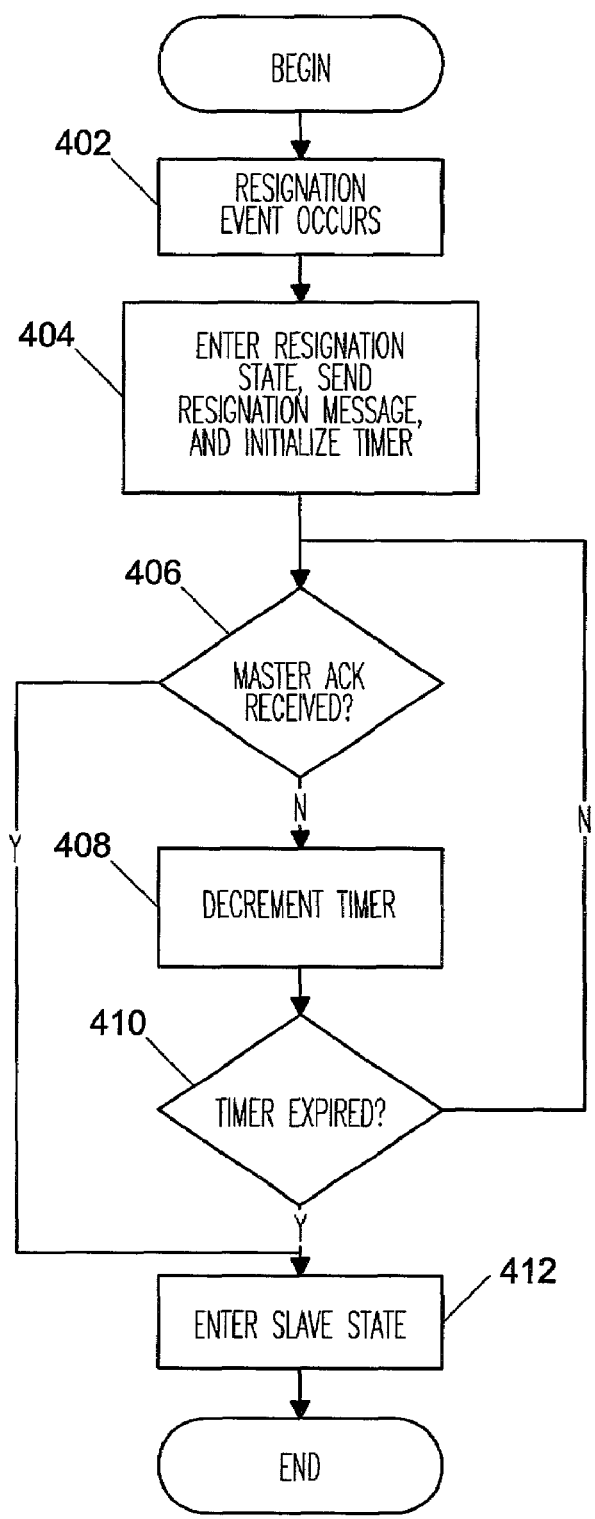
FIG. 4 illustrates a flowchart of a method for a master to resign in accordance with one embodiment of the present invention.

The Resignation State 220 is entered from the Master State 218 when a resignation event occurs, and the node will no longer function as the master for an application instance. FIG. 4 illustrates a flowchart of a method for a master to resign in accordance with one embodiment of the present invention. The method begins, in block 402, when a resignation event has occurred, as detected by the monitor task and reported to the main task.

A resignation event can be a failure of an application instance, an out of tolerance condition, a manual interruption (e.g., by a user at a console), or any other event that indicates the application instance is not or soon will not be operating properly. In one embodiment, the monitor task can be used to initiate a resignation of any or all application instances in the Master State 218 if the health of the node, the operating system, or any particular application deteriorates. For example, the monitor task can periodically check the status of a temperature sensor within the node. If the sensor indicates that the temperature is too high, the task can send a message to the main master-slave task, which then causes all tasks in the Master State 218 to transfer to the Resignation State 220. As another example, the monitor task or another task can periodically call the operating system to check some operating system criteria, such as the system throughput. If the criteria indicate that the operating system is functioning below an acceptable level, the monitor task can send a message to the main task, which can cause some or all application instances in the Master State 218 to transfer to the Resignation State 220, as well.

Referring again to FIG. 4, after a resignation event occurs, the application instance (or instances) enters the Resignation State 220 in block 404, sends a Resignation message over one or more networks, and initializes a Resignation State timer. In one embodiment, the Resignation message is only sent to one other node. In another embodiment, the Resignation message could be sent to multiple nodes or broadcast, with an indication as to which other node should initially attempt to become the master for the application instance. Without such an indication, multiple nodes may simultaneously attempt to become master. The Resignation message informs one or more other nodes in the Slave State for the application instance that an election should be held to elect a new master. After expiration of the Resignation State timer, the node will enter the Slave State for the application instance (or instances).

If invoked before expiration of the Resignation State timer, the main task may determine, in block 406, that the node has received a MasterAck message from another node that has entered the Master State for the application instance. If so, the node enters the Slave State for the application instance, in block 412, and the method ends.

If a MasterAck message has not been received, and the main task has been invoked at a periodic interval, the main task decrements the Resignation State timer, in block 408. The task then determines, in block 410, whether the timer has expired. If not, the procedure iterates as shown. Once the timer has expired, then the node enters the Slave State for the application instance, in block 412, and the method ends.

Conflict State (State 222)

Referring again to FIG. 2, the Conflict State 222 is entered from the Master State 218 when a Conflict message is received from another node. As described previously, a Conflict message indicates that the other node detected one or more other masters for the application instance.

Upon receipt of the Conflict message, the node sends out a Resolve message and initializes a Conflict State timer. The Resolve message requests the identity of the other master. Once the identity of the other master is determined, through receipt of a MasterAck message, the node sends out a Quit message to that other master, and eventually returns to the Master State 218. If the node does not receive the identity of the other master within the timeout period, the node returns to the Master State 218, as well. Alternatively, if the node receives a Quit message from the other master, the node transitions to the Slave State 212 for the application instance.

The node may respond to several other messages while in the Conflict State 222. First, if the node receives a MasterAck message or an Election message from another node that is operating as a master or attempting to become a master of the application instance, the node sends a Quit message to that other node, in an attempt to force the other node into the Slave State. In addition, if the node receives a Resolve message from another node, the node sends a MasterAck message, indicating that the node considers itself to be the master for the application instance.

Now that a state diagram of a master-slave state machine has been described, various aspects and details of the present invention will be further depicted by FIGS. 5-14 and the associated description, below. First, the operation of the main master/state task will be described in conjunction with FIGS. 5-8.

Briefly, the main master-slave task is initialized upon boot up of the node or later. In one embodiment, the main task is then periodically invoked, and also invoked in response to receipt of a message, as will be described in detail below. The major functions of the main task are:

1) to initiate and maintain state machines for application instances operating in the master-slave configuration across the network (including one additional state machine in the Null State 202, FIG. 2); and 2) to respond to state timer timeouts, messages, and other events.

Initialization of the main task includes the creation of a table, referred to herein as an "application instance state table" or "state table." The application instance state table indicates the current state of each application instance, across the network, which is being operated in the master-slave configuration. Accordingly, in one embodiment, the state table enables the main task to perform the first of its major functions, which is initiating and maintaining state machines for application instances across the network.

FIG. 5A is an example of an application instance state table 500 in accordance with one embodiment of the present invention. For each application instance, the table 500 has a field for the application type 502, application instance identifier (application ID) 504, current state 506, and state timer value 508, in one embodiment. As shown in FIG. 5A, the application type 502, application ID 504, and state timer value 508 are designated with integers, and the current state 506 is designated with ASCII values, although they could be designated with other types of characters (e.g., other types of arrays of signed or unsigned characters, or binary or hexadecimal values).

In one embodiment, each application instance is defined by two items of information: the application type 502; and the application ID 504. As its name implies, the application type 502 indicates the type of application (e.g., SCSI router, IP router, or other types) that the application instance corresponds to. In one embodiment, the designators used for the application type 502 are globally known, but they might not be, in another embodiment.

The application ID 504 is an identifier that uniquely identifies each application instance of a particular type to all nodes of the network. For example, the entry 510 having application type "433" has application ID "1037." All nodes of a particular type would be able to uniquely identify the application instance by the application type "433" and application ID "1037." Therefore, the combination of the application type 502 and application ID 504 enables the various nodes to communicate regarding particular application instances. In another embodiment, in which only one application type exists, the application type 502 is not used, and instead the node uses only the application ID 504 to identify the application instance. As indicated by entries 510 and 514, identical application IDs 504 can be assigned if their application types 502 are different. Thus, entries 510 and 514 have identical application IDs of "1037," but different application types of "433" and "763," respectively.

The current state 506 indicates the state, within the state diagram shown in FIG. 2, that each application instance is currently in. The state timer value 508 indicates what the value of the state timer is for the application instance in that particular state. For example, entry 510 indicates that application type "433" and instance "1037" is in the Master State, and that its state timer has a value of "2." In one embodiment, each application instance in the Master State is synchronized to the same value. In the example shown, entries 510, 512, and 516 are in the Master State, and each of these entries currently has a state timer value of "2." In another embodiment, application instances in the Master State do not have synchronized state timer values.

When a state timer value 508 has been decremented to "0," some event typically occurs (e.g., a timer is re-initialized, a state transition occurs, and/or a message is sent out). For example, entry 514 is shown in the Resignation State (220, FIG. 2), with a state timer value of "0." Referring also to FIG. 2, this means that the application instance is about to transition to the Slave State (212, FIG. 2).

Entries for various application instances are added to the table 500 upon boot up of the node, and also later, as various application instances are started on the node or discovered on the network. Once added to the table, an application instance is referred to herein as a "registered application instance." In order for an application instance being run on the node to register itself, the application instance sends a message to the main task, which includes the application ID for the application. The main task, in turn, creates a table entry in the state table 500 for each of these "configured applications" (i.e., applications that are initialized and registered upon boot up). During operation, the main task can create new table entries, as well, for applications or application instances that are detected in other nodes, or that are started (e.g., automatically or from a console connected to the node) and register themselves after boot up.

As described previously, the node also maintains one entry (e.g., entry 518) in the Null State (202, FIG. 2), which is waiting to detect a new application instance within the node or elsewhere on the network. This entry corresponds to a "null application instance," and not to any particular application type. Accordingly, the application type 502 and application ID 504 fields can be null or blank for this entry. Once a new application instance is discovered, the Null State entry 518 will be assigned an application type 502 and application ID 504, and it will be transitioned out of the Null State to either the Slave Startup State (204, FIG. 2) or the Master Startup State (206, FIG. 2). A new Null State entry is then added to the table. As the above description indicates, state machines for application instances are initiated by adding entries to the state table 500.

Besides being defined by the application type and application ID, each application instance is also defined by a "cluster identifier" (cluster ID), in another embodiment. The cluster ID indicates to which "cluster" of application instances the particular application instance belongs. As will be described in more detail later, the concept of clusters enables grouping of application instances and/or application types.

FIG. 5B is an example of an application instance state table 550, which includes cluster IDs 552, in accordance with another embodiment of the present invention. For each application instance, the table 550 has a field for the cluster ID 552, the application type 554, application instance ID 556, current state 558, and state timer value 560, in one embodiment. Although only one cluster is associated with each application instance, a node may have multiple application instances that are associated with different clusters.

FIG. 5B illustrates two different cluster IDs, "612" and "507." This means that each of the various application instances belongs either to cluster "612" or "507." With the addition of the cluster ID 552, another level of delineation is defined. This means that there could be application instances with identical application types 554 and application IDs 556, as long as they exist in different clusters.

In one embodiment, a separate Null State application entry (e.g., entries 568, 578) is included for each cluster ID represented in the table 550, because messages destined for one particular cluster will not be interpreted by or applicable to the other cluster or clusters. In addition, in one embodiment, although the entries in the Master State within each cluster could have synchronized state timer values, the Master State entries in all clusters need not be the same. Thus, for example, in the cluster identified by cluster ID "612," Master State entries 562, 564, and 566 each have a state timer value 560 of "2," and in the cluster identified by cluster ID "507," Master State entries 570, 572, 574, and 576 each have a state timer value 560 of "10."

Figure 6:
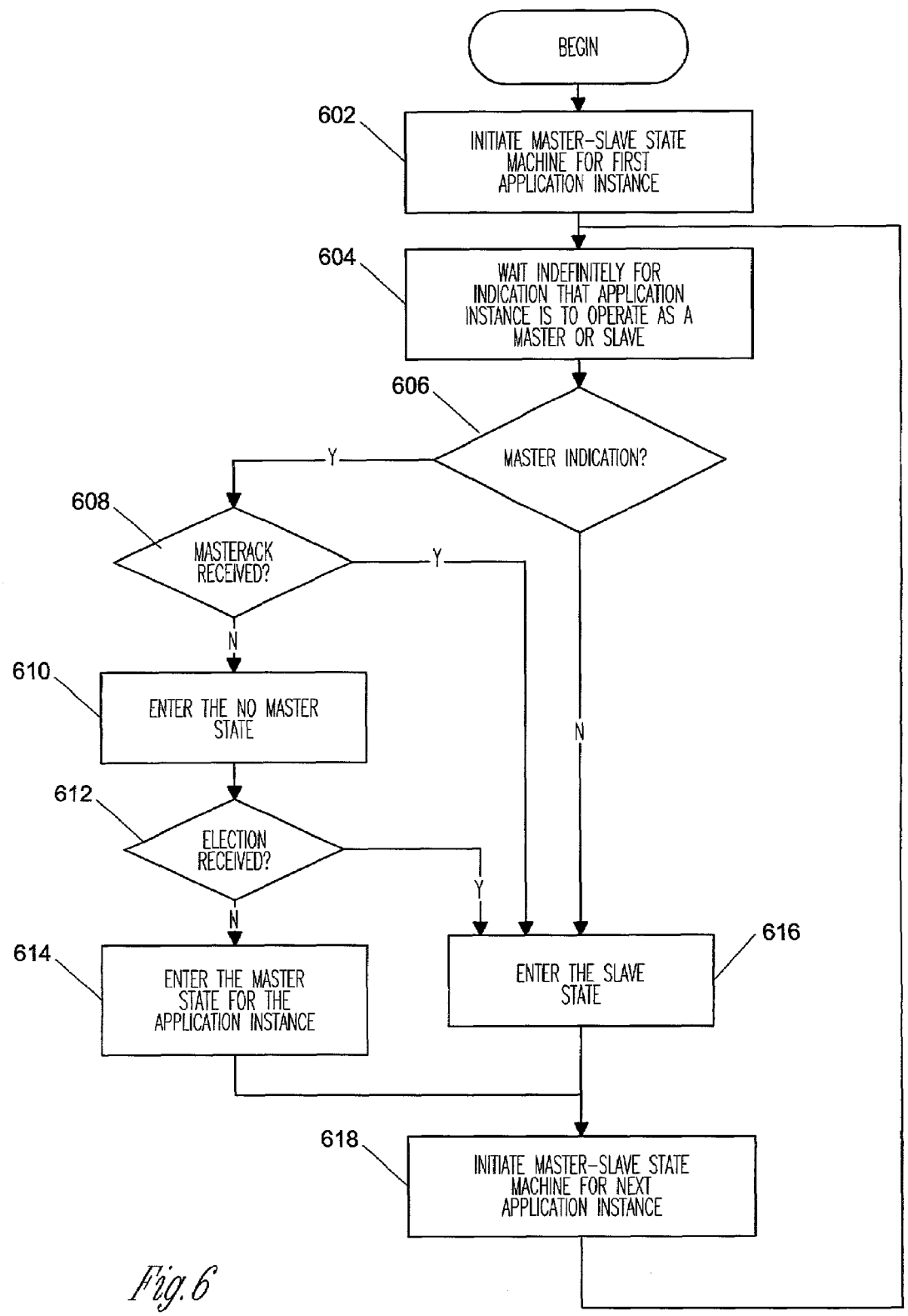
FIG. 6 illustrates a flowchart of a method for initiating multiple master-slave state machines in accordance with one embodiment of the present invention.

FIG. 6 illustrates a flowchart of a method for initiating multiple master-slave state machines in accordance with one embodiment of the present invention. The flowchart in FIG. 6 is intended to illustrate that the main task is capable of maintaining state information for as few as zero application instances or multiple application instances simultaneously. The flowchart is highly simplified, and does not illustrate all possible state transitions, as was illustrated in FIG. 2. In addition, the flowchart in FIG. 6 illustrates that the main task maintains at least one application instance in the Null State (202, FIG. 2) at all times. This "null application" waits and listens, until something tells it to transition towards the Master State (218, FIG. 2) or the Slave State (212, FIG. 2).

The method begins, in block 602, after a first master-slave state machine for a first application instance has been initiated. In order to initiate the first state machine, the main task creates a first entry in the state table. Initially, the current state (506, FIG. 5) of the first entry would be the Null State (202, FIG. 2).

The main task then waits indefinitely, in block 604, for an indication that the first application instance is to be operated on the node as a master or as a slave. If the first application instance is to be operated as a master, the indication could be, for example, information (e.g., a message or some other indicator) that the first application instance is a configured application instance that is initiated when the node is booted up. Alternatively, a master indication could be information that the first application instance is a new application instance that is initiated on the node after boot up (e.g., automatically or by a user at a console). An indication that the node is to be operated as a slave could come, for example, in the form of a message that another node has called an election to attempt to become the master for the application instance. Similarly, a slave indication could come in the form of a message indicating that another node has entered the master state for the application instance. The slave indication also could be a Heartbeat message received from a master or slave that was previously unknown to the node.

If the main task determines, in block 606, that it has received a master indication, it moves the first instance to the Master Startup State (206, FIG. 2) by changing the current state field (506, FIG. 5) in the state table (500, FIG. 5). The main task also initializes the state timer value (508, FIG. 5) to the appropriate value for the Master Startup State. If, as determined in block 608, no MasterAck message is received before the expiration of the Master Startup State timer, the main task changes the current state field (506, FIG. 5) to the No Master State (210, FIG. 2), and initializes that state's timer value (508, FIG. 5). After entering the No Master State, in block 610, a determination is made whether an Election message has been received before the expiration of the No Master State timer, in block 612. If not, the main task causes the first application instance to enter the Master State (218, FIG. 2) for the application instance, in block 614, by changing the current state field (506, FIG. 5) to the Master State. If it is determined in block 608 or 612, that a MasterAck message or an Election message has been received in either the Master Startup State or the No Master State, respectively, then the main task ultimately causes the first instance to enter the Slave State (212, FIG. 2), in block 616.

Once the first application instance has been transferred out of the Null State, the main task initiates another master-slave state machine for the next application instance, in block 618. The procedure then iterates, as shown in FIG. 6, where the main task again waits indefinitely for an indication whether the next task is to become a master or a slave. Although block 618 is shown to occur last on the flowchart, initiation of a state machine for the next application instance could occur anywhere after block 604. In addition, once multiple state machines have been initiated, they would essentially be operated in a parallel manner.

As mentioned previously, the main task executes periodically and also upon the receipt of a message, in one embodiment. When executing periodically, the main task selects and evaluates each table entry, and performs any necessary state transition or other function. In contrast, when executing in response to receipt of a message, the main task performs any necessary state transition or other function only for those application instances that are identified in or affected by the message.

Figure 7:
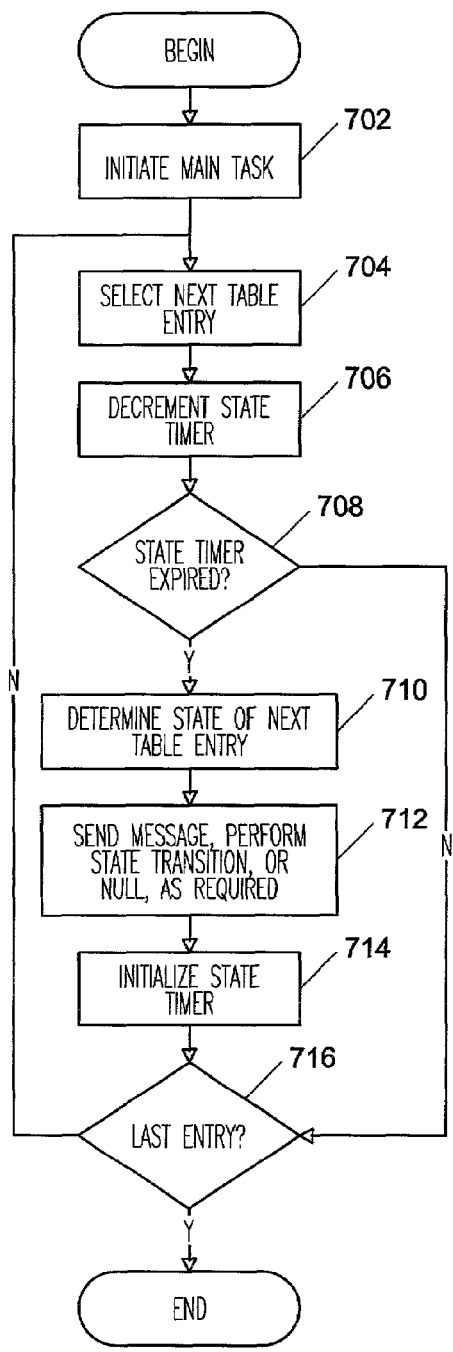
FIG. 7 illustrates a flowchart of a method for a main master-slave task to execute periodically in accordance with one embodiment of the present invention.

FIG. 7 illustrates a flowchart of a method for a main master-slave task to execute periodically in accordance with one embodiment of the present invention. The method begins, in block 702, after the main task has been periodically initiated. In one embodiment, the task is initiated upon expiration of a system timer, referred to herein as a "watchdog timer," which is re-initialized after it expires.

The main task selects, in block 704, the next entry in the application instance state table (e.g., table 500, FIG. 5). In one embodiment, entries are evaluated in a top-down, sequential order, although the entries could be evaluated in a different order as well. The task then decrements the state timer (508, FIG. 5) for the next table entry, in block 706.

A determination is made, in block 708, whether the state timer has expired (e.g., whether it has been decremented to zero or less). If so, the main task determines the current state (506, FIG. 5) of the application instance corresponding to the entry, in block 710. Based on the current state, the main task then sends a message, performs a state transition, or does nothing, as required, in block 712. The particular action (or inaction) performed by the main task depends on the state, as was described in detail in conjunction with FIG. 2. The main task then initializes the expired state timer or the state timer of the newly entered state, in block 714.

If the state timer has not expired, as determined in block 708, or after initializing the state timer, in block 714, the main task determines whether the application instance state table entry just evaluated was the last entry of the table, in block 716. If not, the procedure iterates as shown, and the main task evaluates the next entry in the table. If the last entry has been evaluated, then the main task ends. The main task is then later initiated again upon expiration of the watchdog timer or upon the occurrence of some message event, as described below.

Figure 8:
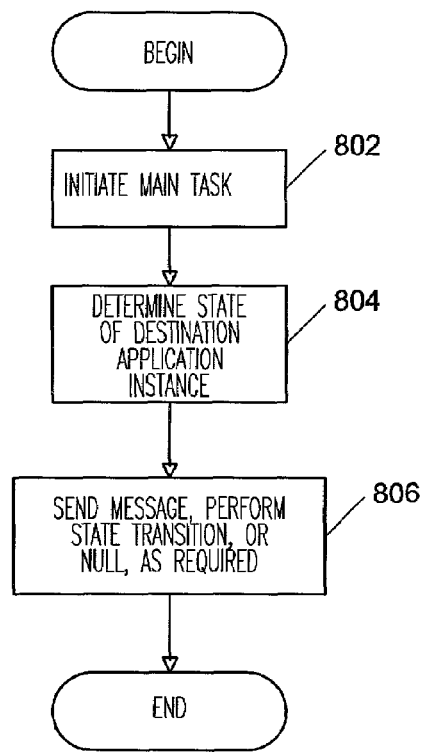
FIG. 8 illustrates a flowchart of a method for a main master-slave task to execute when a message event occurs in accordance with one embodiment of the present invention.

FIG. 8 illustrates a flowchart of a method for a main master-slave task to execute when a message event occurs in accordance with one embodiment of the present invention. The method begins, in block 802, when the main task is initiated after a message has been received that may affect the state diagram of one or more application instances that the main task is monitoring. The message could be received, for example, from another node that is operating in the master or slave state for an application instance. These types of messages are referred to herein as "network" or "inter-node" messages. Alternatively, a second message type could be received from the monitor task running on the node, as will be described in more detail in conjunction with FIG. 10. These second message types are referred to herein as "internal" or "intra-node" messages.

In one embodiment, all network messages received from other nodes include an "application identifier" (928, FIG. 9), which indicates to which application instance the message pertains. This application instance is referred to herein as the "destination application instance."

In contrast, for internal messages, the message can use an internal mechanism of identifying a single destination application instance, in one embodiment. For example, the monitor task could have determined that the node soon will lose power, and that all applications being run on the node in the Master State should resign. The monitor task would create a series of messages, each of which identifies those application instances in the master state, and indicates the problem encountered.

The main task selects the entry (or entries) in the application instance state table (e.g., table 500, FIG. 5) that corresponds to the application identifier in the message, and determines the current state of the destination application instance, in block 804. Based on the current state, the main task, in block 806, then sends a message, performs a state transition, or does nothing, as required. The particular action (or inaction) performed by the main state depends on the state, as was described in detail in conjunction with FIG. 2. If a state transition was performed, the main task then initializes the corresponding state timer. The method then ends.

FIGS. 7 and 8 illustrate that the main task is initiated both periodically and when a message event occurs. In another embodiment, rather than invoking the main task for a message event, the node could queue up received messages, and the main task could respond to the queued messages the next time the task is periodically invoked. In still another embodiment, the main task could be run continuously. Accordingly, the main task could alter the various state timers based on a system clock, and the task could respond to messages when they are received.

As mentioned previously, network messages sent between nodes include one or more application identifiers, each of which identifies the application instance to which the message pertains. In one embodiment, various messages include other fields as well.

Figure 9:
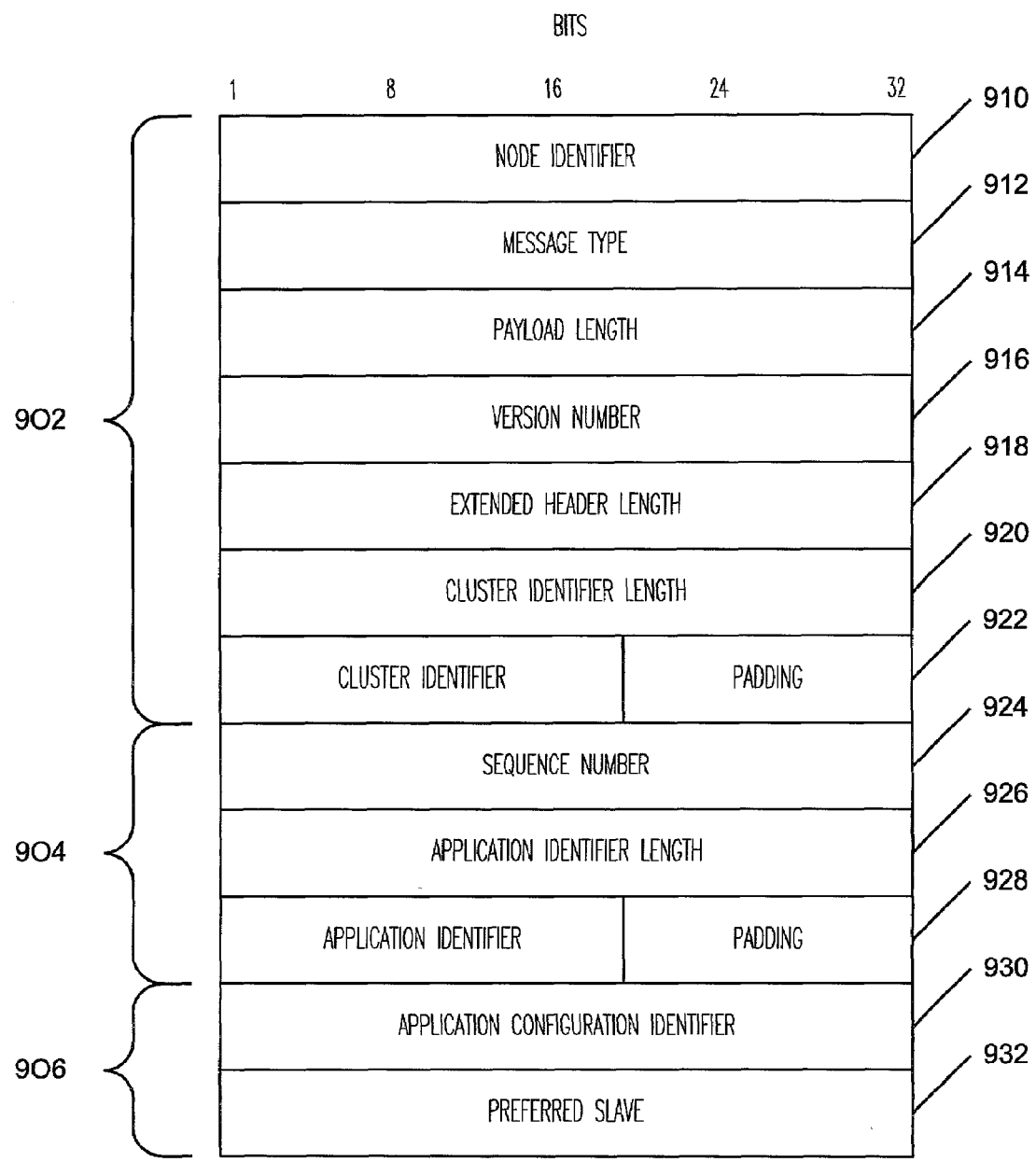
FIG. 9 illustrates a diagram of a message format in accordance with one embodiment of the present invention.

FIG. 9 illustrates a diagram of a message format in accordance with one embodiment of the present invention. In one embodiment, each message field 910-932 is in a long-word aligned, 32-bit format, rather than an 8-bit byte format, as was used for the TSP protocol of the prior art. Accordingly, the message format of this embodiment is better suited for modern computers, which work more efficiently on long-word aligned messages. The format makes message creation and processing easier, and avoids masking and shifts, to a large extent. In other embodiments, the message fields could have more or fewer bits, as is appropriate for the network and computer systems upon which the present invention is implemented.

The basic message format includes a header 902 and a payload. The payload includes one or more Application Information Blocks (AIB) 904. For some types of messages, described later, the payload consists of one or more Extended AIBs (EAIB) 906.

The header 902 includes several fields: a node identifier 910; message type 912; payload length 914; version number 916; extended header length 918; cluster identifier length 920; and cluster identifier 922. The node identifier field 910 includes a value, which uniquely identifies the node from which the message was sent.

The message type field 912 includes a value, which indicates what type of command or response the message is. For example, the message type could be a MasterAck message, an Election message, a Heartbeat, a Resignation message, or any other type of message that was described in conjunction with FIG. 2. In other embodiments, additional or different messages could be included in the protocol, besides the messages described in conjunction with FIG. 2.

The payload length field 914 includes a value, which indicates the total size of the message's payload. This allows the node to perform buffer size comparisons against the size of the message payload to be processed. In some cases, elements of the payload may be zero-padded. In one embodiment, the length of the zero padding is included in the payload length. In another embodiment, the payload length field 914 could be used as a message length field and could include a value indicating the length of the entire message being processed, rather than just the payload length.

The version number field 916 includes a value, which indicates the protocol version number of the message. For example, the initial version of the protocol could have a version number of "1." Future updated versions, which could include changes to message contents or format, would have higher (or different) version numbers. The version number enables the receiving node to know the protocol version on which the node should base its processing of the message.

Similarly, the extended header length field 918 includes a value, which indicates how much longer the header 902 is for the new protocol version, if at all longer. For the initial version, the value would likely be "0." By including the version number field 916 and the extended header length field 918, nodes that cannot process all the elements of the current version of the protocol are still able to process those fields that are known. Accordingly, the header format enables both backward and forward compatibility.

The header 902 also includes two fields 920, 922, which help to identify a "cluster" of nodes for which the message is pertinent. A cluster is a named, virtual group of nodes, interconnected by one or more networks. The nodes in a cluster send each other Heartbeat messages and act as masters and slaves for each other for various application instances. The concept of clusters enables grouping of application instances and/or application types. In one embodiment, each node is a member of only one cluster. In other embodiments, a node could be a member of more than one cluster (e.g., as illustrated in FIG. 5B).

The cluster for which the message is pertinent is identified in a cluster identifier field 922 of header 902. In one embodiment, the cluster identifier is an array of unsigned characters that is padded out to the nearest long word address. Therefore, the cluster identifier field 922 may contain one or more bits of padding (e.g., zero padding). In order to identify the length of the cluster identifier, the header 902 also includes a cluster identifier length field 920, in one embodiment. The cluster identifier length specifies the true length of the cluster identifier, minus any padding.

As described previously, each message also includes a payload that consists of one or more AIBs 904. In one embodiment, the AIB 904 includes several fields: a sequence number 924; application identifier length 926; and application identifier 928.

As indicated in the description of FIG. 2, it is not imperative that messages receive responses, in accordance with one embodiment. However, certain message exchanges do hope for a request-response sequence. For example, when a MasterReq message is sent out, it is expected that a MasterAck message may be received in response. Therefore, in one embodiment, a sequence number is included with some or all messages.

The sequence number field 924 includes a sequence number, which is incremented for every request message that a master creates and sends for a particular application instance. In one embodiment, slaves do not maintain a sequence number to identify requests that it sends, because slaves rarely (or never) send such requests. In another embodiment, each slave does maintain a sequence number for requests that it sends. In still another embodiment, sequence numbers are not needed, and therefore are not used by masters or slaves at all.

A response that a slave makes to the master's request message uses the same sequence number that was in the master's request message. Therefore, the sequence number enables the master to associate a slave's response to the associated, previously-sent request.

In one embodiment, each slave keeps track of a master's sequence number for each application instance. This enables a slave to avoid reacting to or responding to previously received messages. In other words, the sequence number enables the slave to identify duplicate messages, such as duplicate messages that a master sends out on multiple networks.

In one embodiment, when a slave is promoted to a master for an application instance, the slave uses an incremented continuation of the sequence number used by the previous master. By using a continuation of the sequence number, other slaves will not reject the new master's messages as having been previously sent or unrecognized.

The application instance for which the message is pertinent is identified in a application identifier field 928 of AIB 904. In one embodiment, the application identifier includes the application type and the particular application instance ID to which the message pertains (i.e., the destination application instance). The application identifier is an array of unsigned characters that is padded out to the nearest long word address. Therefore, the application identifier field 928 may contain one or more bits of padding (e.g., zero padding). In order to identify the length of the application identifier, the AIB 904 also includes an application identifier length field 926, in one embodiment. The application identifier length specifies the true length of the application identifier, minus any padding.

For some types of messages, the payload includes one or more EAIBs 906. For example, the MasterAck and Heartbeat messages include one or more EAIBs 906, in one embodiment. The EAIB extends the AIB with two additional fields: an application configuration identifier 930, and a preferred slave 932.

The application configuration identifier field 930 indicates an identifier of the current configuration of the database, if any, that a master is using for a particular application instance. This enables slaves to determine whether the configuration information that they are using is correct or is outdated. In the event that the configuration information that a slave is using is outdated, the slave node requests the correct configuration information from the master or elsewhere.

Finally, the EAIB 906 includes a preferred slave field 932. The preferred slave field 932 includes a value that identifies which of the potential slaves is preferred as the new master, in the event that the current master resigns or is unable to continue serving as the master for an application instance.

Although the description of FIG. 9, above, specifies a number of different message fields 910-932 arranged in a certain order, more, fewer or different message fields could be included in other embodiments, and these message fields could be arranged in different orders than the order shown in FIG. 9.

As described previously, in one embodiment, a separate "monitor task," exists to monitor, for correct operation, those application instances that are in the master state on the node. In addition, the monitor task can monitor the operation of the node itself and/or various functions or components associated with the node (e.g., the CPU, memory, operating system, temperature or radiation sensor, power supply, etc.). For ease of description, the term "application instance" is meant to refer to any entity that is being monitored by the monitor task, including but not limited to, applications, application instances, the node, and/or various components associated with the node.

Each application instance that wants to be monitored for correct operation "registers" itself by sending a message to the main task. This message identifies the application instance, and also includes the criteria that the monitor task should use to determine whether or not the application instance is operating correctly. The operating system and/or the node itself can also ask the monitor task to monitor particular functions for correct operation, in one embodiment. For example, the node may ask the monitor task to periodically check the value of a sensor that measures the temperature of the node, a component, or the atmosphere. As another example, the operating system may ask the monitor task to periodically check certain performance metrics, such as operating system throughput, for example.

Figure 10:
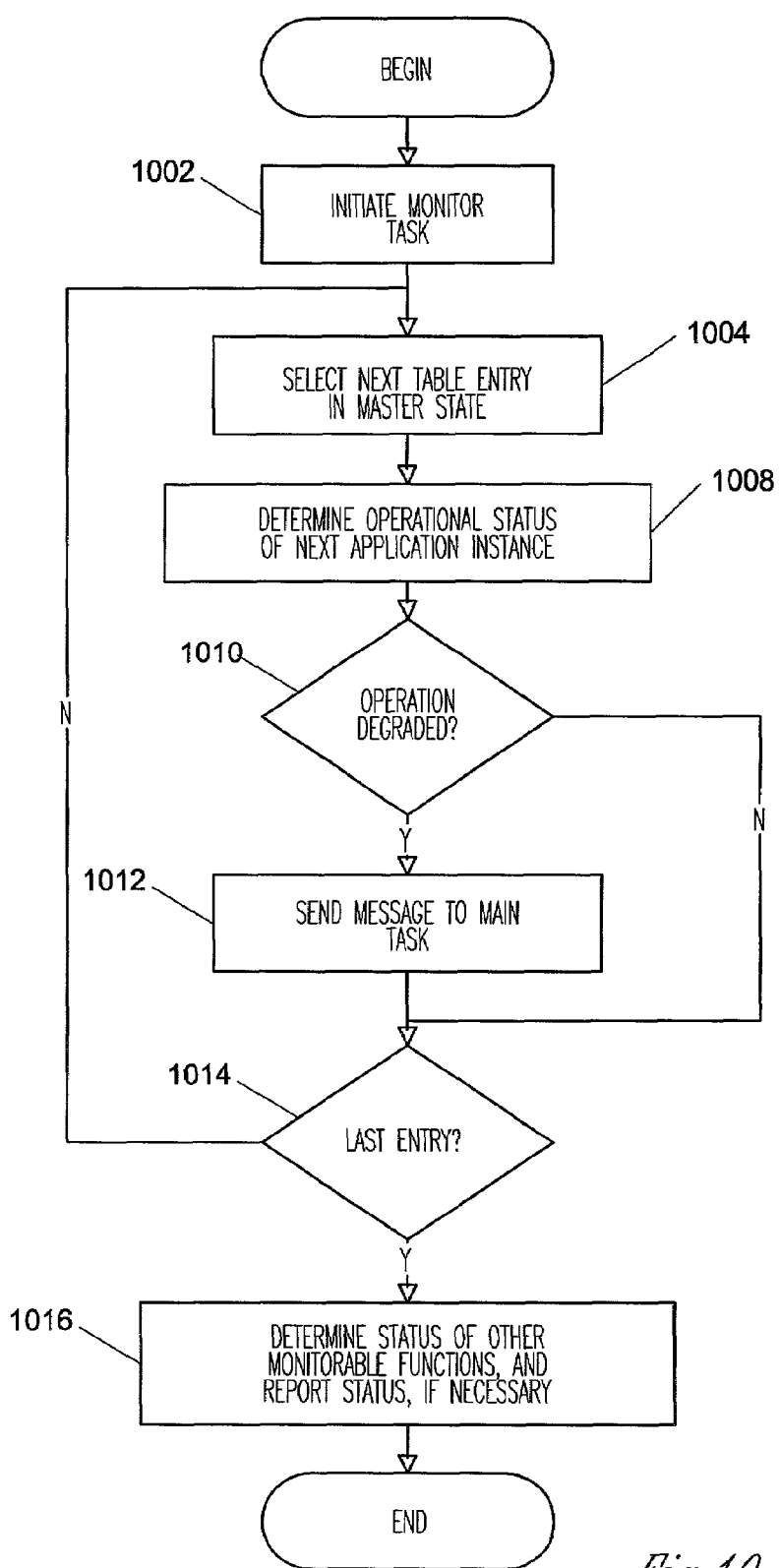
FIG. 10 illustrates a flowchart of a method for a monitor task in accordance with one embodiment of the present invention.

FIG. 10 illustrates a flowchart of a method for a monitor task to monitor application instance operations in accordance with one embodiment of the present invention. In one embodiment, the monitor task is a separate task from the main master-slave task, and both tasks are separately invoked. In another embodiment, some or all of the functionality of the monitor task is incorporated into the main task.

The method begins, in block 1002, after the monitor task has been periodically initiated. In one embodiment, the task is initiated upon expiration of a system timer, which is re-initialized after it expires. The system timer could be the same watchdog timer as is used by the main task, or it could be a separate timer. In another embodiment, the monitor task is aperiodically invoked, for example, when some interrupt or message is received.

In one embodiment, the monitor task steps through the entries in the application instance state table (e.g., table 500, FIG. 5), and determines the operational status of those instances that the monitor task has been asked to monitor. In one embodiment, this is achieved by the monitor task selecting, in block 1004, the next entry in the application instance state table (e.g., table 500, FIG. 5). In one embodiment, the monitor task only monitors those application instances that are in the Master State. If the next entry is not in the Master State, the monitor task proceeds through the table until it finds an entry in the Master State. In another embodiment, the monitor task can monitor application instances that are in other states as well.

The monitor task then determines, in block 1008, the operational status of the application instance. In one embodiment, this is done by comparing the current operational status with the performance criteria that the application instance provided to the monitor task during registration (or later).

In block 1010, the monitor task determines whether the operation of the application instance is degraded. If so, then in block 1012, the monitor task sends an intra-node (i.e., internal) message to the main task, which identifies the application instance. The message also may give other information, such as an indication of the severity of the operational degradation, or an amount of time before the application instance will not be able to function as a master, for example. The monitor task may then cause one or more application instances to resign as masters, as described previously. Should an application, application instance, operating system function, or the node function simply fail before the monitor task can alert the main task, or before the main task initiates or completes a resignation procedure, the node may not be able to send out Heartbeat messages, and one or more of the slave nodes will hold an election to attempt to take over the failed application instances.

If the operation is not degraded, as indicated in block 1010, or after sending a message to the main task, in block 1012, the monitor task determines whether the application instance state table entry just evaluated was the last entry of the table, in block 1014. If not, the procedure iterates as shown, and the monitor task evaluates the next entry in the table corresponding to an application instance in the Master State. If the last entry has been evaluated, then the monitor task, in block 1016, determines the operational status of any other monitorable functions or components, which might not have been included in the application instance state table. For example, the node could have registered with the monitor task to check the charge of the node's battery. If the battery charge is too low, it could represent an imminent failure of all application instances in the Master State. If necessary, the monitor task reports the status of these functions or components to the main task. Alternatively, the monitor task could send one or more messages to the main task, indicating which application instances may be affected by the degraded operational status of a particular function or component. The method then ends. The monitor task is then later initiated again upon expiration of the timer, or upon the occurrence of some interrupt or message event, as described above.

As described previously, the method of the various embodiments can be implemented in a system where nodes are connected together over multiple networks. This network redundancy allows nodes still to communicate with each other when one or more (but fewer than all) of the networks fail.

A number of different messages were described in conjunction with FIG. 2. In one embodiment, each node can send out a message over one or more of the networks to which it is connected. Accordingly, a node may receive redundant messages over more than one network. Because the prior art TSP protocol did not contemplate nodes being interconnected by multiple networks, that protocol also did not contemplate handling redundant messages. In some cases, the receipt of redundant messages would cause the prior art protocol to function inappropriately.

For example, the TSP protocol of the prior art dictates that, if a TSP node receives an election message while in the slave state, it will go to the accept state. If it receives a second election message, it has no choice but to assume it is from a different slave that wants to become a master, and it sends a refuse message. Referring to FIG. 2, and in accordance with one embodiment, if a node receives an Election message from a master candidate while in the Slave State 212, it will also go to the Accept State 214. If it receives a second Election message, it will first determine whether it originated from the same master candidate as the first message. If the second Election message originated from the same master candidate, the message is ignored. Only if the second message originated from a different master candidate is a Refuse message sent out.

Figure 11:
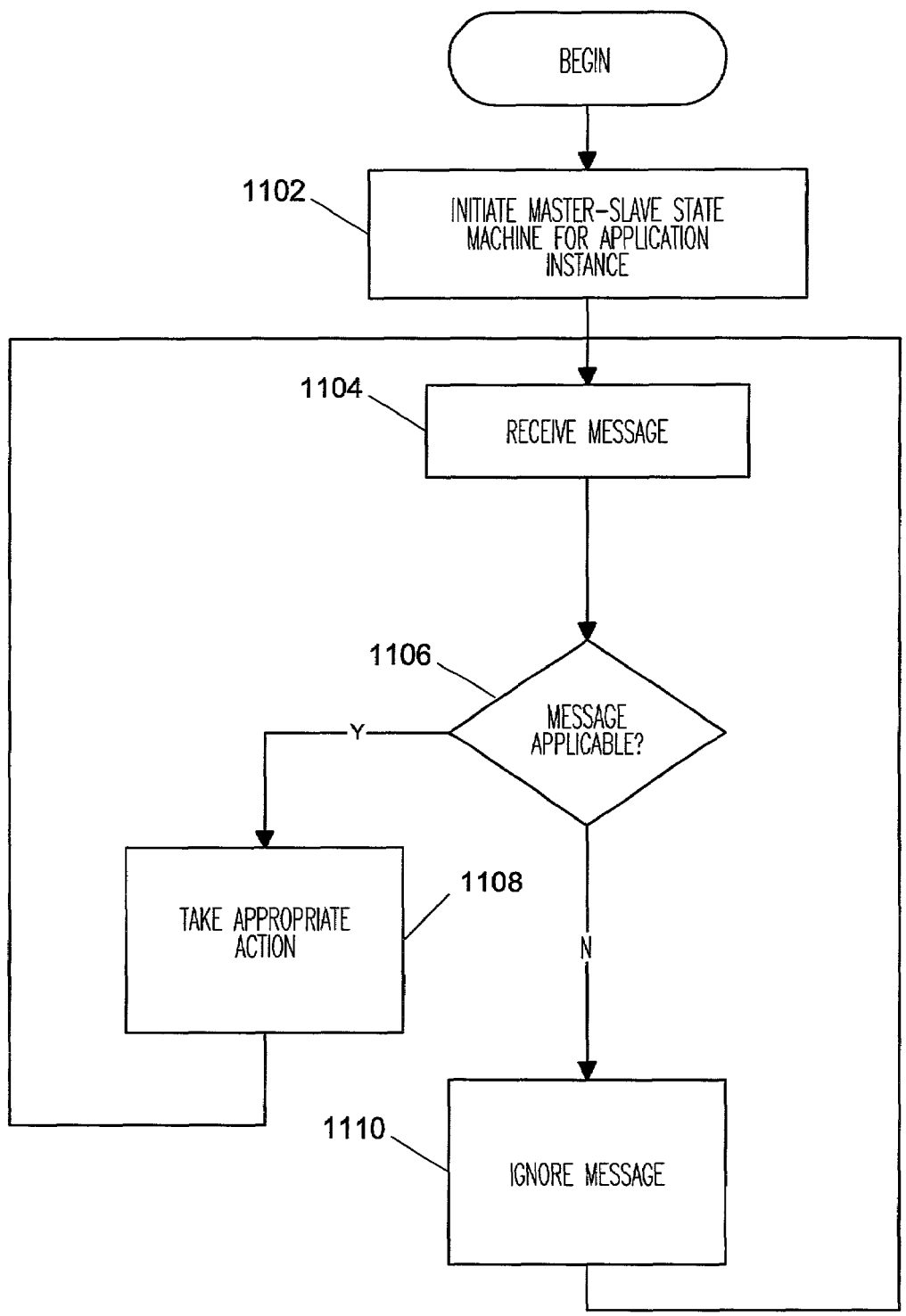
FIG. 11 illustrates a flowchart of a method for a main master-slave task to ignore identical messages in accordance with one embodiment of the present invention.

FIG. 11 illustrates a flowchart of a method for a main master-slave task to ignore identical messages in accordance with one embodiment of the present invention. The method begins, in block 1102, after a master-slave state machine has been initiated for an application instance. During the course of implementing the state machine, various messages may be received, which are pertinent to the application instance associated with the state machine.

When a message is received, as indicated in block 1104, a determination is made whether the message is applicable to the application instance's current state, in block 1106. For example, referring also to FIG. 2, if an application instance is in the Slave State (212, FIG. 2), and the node receives an Election message, the state diagram sends out an Accept message and transitions to the Accept State (214, FIG. 2). If the node receives another Election message from the same master while in the Accept State, that second Election message is ignored, rather than sending a Refuse message to the node that sent the Election message. Thus, when a message is received that causes a transition to another state, receipt of an identical message will not cause anything detrimental to happen to the node or the network. In addition, when a message is not applicable to a state, it also is ignored for the same reason.

Referring back to FIG. 11, if the message is applicable to the current state, then any action appropriate for reacting to the message is taken, in block 1108, and the method iterates as shown. If the message is not applicable to the current state, then the message is ignored, in block 1110, and the method iterates as shown. By ignoring messages that are not applicable to a particular state, the method of the present invention will not perform inappropriate actions.

As discussed above, each node may be capable of communicating over multiple networks, in one embodiment. Accordingly, each node has an interface to each of the multiple networks to which it will communicate. Messages are sent and received by the node using these interfaces.

The actual details of how to use and implement access to and from the network interfaces are well known by those of skill in the art and are not described in detail here. One common feature of using multiple network interfaces is that messages sent or received by each interface will identify the sender as having a different source address. This makes it very difficult or nearly impossible, using prior art methods, to determine the identity of the sender and thus prior art methods can not avoid processing or reacting to redundant messages.

To resolve this, each node is given a globally unique identifier called the "node ID," in one embodiment. During operation, this identifier is included in all messages (see the node identifier 910 from header 902, FIG. 9), so that redundant messages can always be identified, regardless of the interface from which they arrived. Knowledge of the interface from which a message was received, the network address of the sender using that interface, and the sender's node ID are important items of information for operating in a situation where nodes can be interconnected in a redundant manner.

Returning to the example described above in conjunction with FIG. 11, when a node receives a second Election message, the sender's node ID is checked against the master candidate recorded from the first Election message. In essence, part of the determination of whether a message is applicable and action is warranted (block 1108) is determining whether the message being processed is a copy of a previous message received from the same sender over a different interface or the message is a new message from a new node.

To take advantage of the multiple connections, many messages (i.e., requests and responses) are sent out using all the available interfaces, in one embodiment, although some or all messages alternatively could be sent out using only one available interface. To send messages directed at particular nodes, it is important to know each of that node's network addresses. Therefore, in one embodiment, each node keeps a record of the nodes that it has heard from and maps those nodes' IDs to its network addresses on a per interface basis. This allows the node not only to communicate with other nodes using the multiply connected network, but also to validate and check that other nodes are not using addresses incorrectly.

Figure 12:
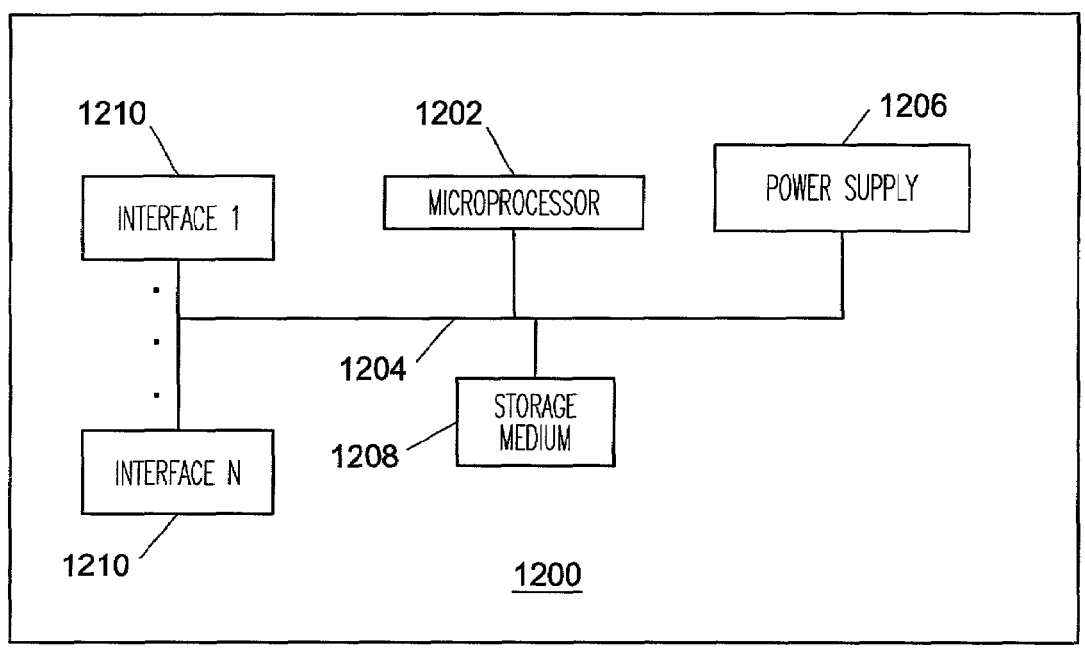
FIG. 12 illustrates a general-purpose computer within which functions of the various embodiments can be practiced in accordance with one embodiment of the present invention.

FIG. 12 illustrates a general-purpose computer system 1200 (e.g., a node) within which functions of the various embodiments can be practiced in accordance with one embodiment of the present invention. The computer system is housed on one or more PC boards, and includes one or more microprocessors 1202, busses 1204, power supplies 1206, storage medium 1208, and from one to N interfaces 1210 to outside networks. In one embodiment, each of these devices is coupled to bus 1204, so that signals and power can be exchanged between devices. However, it is to be understood that in alternative embodiments, each of the devices could be coupled together through different busses.

Interfaces 1210 provide network connections between computer 1200 and one or more networks. Accordingly, interfaces 1210 enable the exchange of messages between computer 1200 and other computers relating to operating one or more application instances in a master-slave configuration. These messages are processed and/or created by one or more microprocessors 1202 or other processing devices, in one embodiment. In addition microprocessor 1202 executes the main master-slave task and the monitor task, at various times, in accordance with the various embodiments of the invention.

Besides executing the various embodiments on a general-purpose computer system, computer executable instructions for performing the methods of the various embodiments can be stored on one or more computer readable media. For example, such computer executable instructions can be stored on RAM, ROM, hard drive, CD, magnetic disk, disk drive, a combination of these types of storage media, and/or other types of storage media that are well known to those of skill in the art.

CONCLUSION

Various embodiments of methods for supporting communications between multiple nodes operating in a master-slave configuration have been described. The various embodiments have numerous advantages over prior art methods and apparatus. For example, the methods of the various embodiments enable multiple application instances within a single node to be managed using a master-slave configuration, rather than managing only a single application instance, as was possible with the prior art. In addition, the various embodiments can continually listen for and begin managing new application instances within the node or in other nodes. The various embodiments also enable a master of an application instance to resign, causing an election to occur among available slaves. The methods and apparatus of the various embodiments also are easily scalable from 2 to N nodes, without changing the design or implementation of the protocol.

Besides these advantages, the methods and apparatus of the present invention can be used with redundant networks interconnecting the various nodes. This connection redundancy makes the system more robust, as it is less prone to complete failure in the event that one (but fewer than all) of the networks fail. In addition, although the connection redundancy carries the possibility that redundant messages will be received by a node, the methods of the various embodiments are capable of ignoring these redundant messages, thus avoiding inappropriate actions. The methods and apparatus of the present invention provide numerous other advantages over the prior art, as well. In the foregoing detailed description of the preferred embodiments, reference is made to the accompanying drawings, which form a part hereof, and in which are shown by way of illustration specific preferred embodiments in which the invention may be practiced. These embodiments are described in sufficient detail to enable those skilled in the art to practice the invention. It will be appreciated by those of ordinary skill in the art that any arrangement, which is calculated to achieve the same purpose, may be substituted for the specific embodiments shown.

This application is intended to cover various adaptations or variations of the present invention. The foregoing detailed description is, therefore, not to be taken in a limiting sense, and it will be readily understood by those skilled in the art that various other changes in the details, materials, and arrangements of the parts and steps, which have been described and illustrated in order to explain the nature of this invention, may be made without departing from the scope of the invention as expressed in the adjoining claims. Therefore, all such changes are intended to fall within the scope of the present invention.

What is claimed is:

1. A method, performed by a first node, for supporting communications between nodes that are connected by one or more networks, the method comprising:

at the first node:

initiating a first state machine for supporting communications over the one or more networks between the first node and one or more other nodes, wherein the communications relate to executing a first application instance of a plurality of application instances in a master-slave configuration;

entering a master state for the first application instance if there is a first indication that the first node should be a master of the first application instance;

entering a slave state for the first application instance if there is a second indication that a second node already is or is attempting to become a master of the first application instance;

initiating a second state machine for supporting additional messages between the first node and the one or more other nodes, wherein the additional messages relate to executing a second application instance of the plurality of application instances in the master-slave configuration, and wherein at the first node a state of the first application instance and a state of the second application instance can be different from each other; and initiating an additional state machine for each additional application instance for which the first node will be operating in the master-slave configuration.

2. The method as claimed in claim 1, wherein entering the master state comprises:

receiving the first indication in a form of information that the first application instance is a configured application instance that is initiated when the first node is booted up; and entering the master state for the configured application instance.

3. The method as claimed in claim 1, wherein entering the master state comprises:

receiving the first indication in a form of information that the first application instance is a new application instance that is initiated after the first node is booted up; and entering the master state for the new application instance.

4. The method as claimed in claim 1, wherein entering the slave state comprises:

after receiving the first indication, receiving the second indication in a form of a message that the second node has called an election to attempt to become the master for the first application instance; and entering the slave state for the first application instance.

5. The method as claimed in claim 1, wherein entering the slave state comprises:

receiving the second indication in a form of a first message indicating that the second node has already entered the master state for the first application instance;

sending a second message requesting an identity of the second node; and entering the slave state after receiving a third message that includes the identity of the second node.

6. The method as claimed in claim 1, further comprising:

after entering the master state, determining whether the first node should continue to be the master for the first application instance;

if the first node should not continue to be the master for the first application instance, sending a message indicating that the first node is resigning as the master of the first application instance; and entering the slave state for the first application instance.

7. The method as claimed in claim 1, further comprising:

after entering the master state, receiving a first message indicating that a second node of the one or more other nodes has entered the master state for the first application instance;

receiving a second message from the second node that indicates that the first node should quit as the master; and entering the slave state for the first application instance.

8. The method as claimed in claim 1, further comprising:

after entering the master state, occasionally sending a Heartbeat message that identifies the first node and indicates that the first node is in the master state for the first application instance.

9. The method as claimed in claim 1, further comprising:

waiting indefinitely until the first node receives the first indication or the second indication; and wherein initiating the second state machine includes waiting indefinitely until a third indication indicates that the first node is to become a master or a slave for the second application instance.

10. The method as claimed in claim 1, further comprising:

initiating an additional state machine for each additional application instance for which the first node will be operating in the master-slave configuration.

11. The method as claimed in claim 1, further comprising:

selecting a first entry in a table that includes information relevant to one or more application instances being executed in the master-slave configuration, wherein the first entry corresponds to the first application instance;

determining a first state of the first application instance, wherein the first state is a state of the first state machine;

determining, based on the first state, whether an action is required relating to executing the first application instance in the master-slave configuration; and if the action is required, taking the action.

12. The method as claimed in claim 1, wherein the one or more networks include multiple networks, the method further comprising:

receiving a first message, over a first network of the multiple networks, from a second node of the one or more other nodes, wherein the first message is applicable to an application instance, and the first message causes the first node to take a first action;

receiving a second message, over a second network of the multiple networks, wherein the second message is not applicable to a current state of the application instance; and the first node not taking a second action in response to the second message.

13. The method as claimed in claim 1, wherein the one or more networks include multiple networks, the method further comprising:

receiving a first message from a second node of the one or more other nodes, over only a first network but not a second network of the multiple networks; and sending a second message in response to the first message.

14. The method as claimed in claim 1, further comprising:

sending a first message, over a first network of the one or more networks, wherein the first message includes a header and a payload, wherein the header includes a value identifying the first node, an indicator of a type of the first message, and an indicator of a length of the payload, and wherein the payload includes a variable number of bytes of information specific to the type of the first message.

15. A first node within a computer system, the first node comprising:

at least one interface to at least one external network, wherein the at least one external network is to interconnect the first node and one or more other nodes; and at least one processor, to initiate a first state machine for supporting communications over the at least one external network, wherein the communications relate to executing a, first application instance of a plurality of application instances in a master-slave configuration, and the at least one processor also is to enter a master state for the first application instance if there is a first indication that the first node should be a master of the first application instance, and is to enter a slave state for the first application instance if there is a second indication that a second node already is or is attempting to become the master of the first application instance, the at least one processor also is to initiate a second state machine for supporting additional messages between the first node and the one or more other nodes, wherein the additional messages relate to executing a second application instance of the plurality of application instances in the master-slave configuration, and wherein at the first node a state of the first application instance and a state of the second application instance can be different from each other; and the at least one processor also is to initiate an additional state machine for each additional application instance for which the first node will be operating in the master-slave configuration.

16. The first node as claimed in claim 15, wherein the at least one processor also receives the first indication in a form of information that the first application instance is a configured application instance that is initiated when the first node is booted up, and the at least one processor enters the master state for the configured application instance.

17. The first node as claimed in claim 15, wherein the at least one processor enters the master state when the at least one processor receives the first indication in a form of information that the first application instance is a new application instance that is initiated after the first node is booted up.

18. The first node as claimed in claim 15, wherein the at least one processor enters the slave state when, after receiving the first indication, the at least one processor receives the second indication in a form of a message that the second node has called an election to attempt to become the master for the first application instance.

19. The first node as claimed in claim 15, wherein the at least one processor enters the slave state when the at least one processor receives the second indication in a form of a first message indicating that the second node has already entered the master state for the first application instance, and the at least one processor sends a second message requesting an identity of the second node, and enters the slave state after receiving a third message that includes the identity of the second node.

20. The first node as claimed in claim 19, wherein the at least one processor, prior to entering the slave state, waits a timeout period before entering the slave state, and if, during the timeout period, the first node receives a fourth message from a different node of the at least one of the one or more other nodes indicating that the different node has entered the master state for the first application instance, the first node sends a fifth message that informs the second node that a conflict exists.

21. The first node as claimed in claim 15 wherein, after entering the master state, the at least one processor determines whether the first node should continue to be the master for the first application instance, and if the first node should not continue to be the master for the first application instance, the first node sends a message indicating that the first node is resigning as the master of the first application instance, and the at least one processor enters the slave state for the first application instance.

22. The first node as claimed in claim 21, wherein the at least one processor determines whether the first node should continue to be the master by determining whether the first application instance will be performing in accordance with performance criteria related to the first application instance, and if the first application instance will not be performing in accordance with the performance criteria, determining that the first node should not continue to be the master for the first application instance.

23. The first node as claimed in claim 22, wherein the performance criteria relate to performance of the first node, and the at least one processor determines whether the first application instance will be performing in accordance with the performance criteria by determining whether the first node will be performing in accordance with performance criteria, and if the first node will not be performing in accordance with the performance criteria, determining that the first node should not continue to be the master for the first application instance.

24. The first node as claimed in claim 15 wherein, after entering the master state, the at least one processor is to receive a first message indicating that a second node of the one or more other nodes has entered the master state for the first application instance, and the at least one processor is to receive a second message from the second node that indicates that the first node should quit as the master, and the at least one processor is to enter the slave state for the first application instance.

25. The first node as claimed in claim 15 wherein, after entering the master state, the at least one processor occasionally sends a Heartbeat message that identifies the first node and indicates that the first node is in the master state for the first application instance.

26. The first node as claimed in claim 15, wherein the at least one processor waits indefinitely until the at least one processor receives the first indication or the second indication, and wherein initiating the second state machine includes waiting indefinitely until a third indication indicates that the first node is to become a master or a slave for the second application instance.

27. The first node as claimed in claim 15, wherein the at least one processor also initiates an additional state machine for each additional application instance for which the first node will be operating in the master-slave configuration.

28. A computer readable storage medium having computer executable instructions stored thereon for performing a method of supporting communications between a first node and one or more other nodes operating in a master-slave configuration, the method comprising:
at the first node:
initiating a first state machine for supporting the communications over at least one external network, wherein the communications relate to executing a first application instance of a plurality of application instances in the master-slave configuration;
entering a master state for the first application instance if there is a first indication that the first node should be a master of the first application instance;
entering a slave state for the first application instance if there is a second indication that a second node already is or is attempting to become the master of the first application instance; and
initiating a second state machine for supporting additional messages between the first node and the one or more other nodes, wherein the additional messages relate to executing a second application instance of the plurality of application instances in the master-slave configuration, and wherein at the first node a state of the first application instance and a state of the second application instance can be different from each other at the first node; and
initiating an additional state machine for each additional application instance for which the first node will be operating in the master-slave configuration.

29. The computer readable medium as claimed in claim 28, wherein the method further comprises:
receiving a first message, over a first network of the at least one external network, from another node of the one or more other nodes, wherein the first message is applicable to an application instance and causes the first node to take a first action; and
receiving a second message, over a second network of the at least one external network, wherein the second message is not applicable to a current state of the application instance, and the first node does not take a second action in response to the second message.

30. The computer readable medium as claimed in claim 28, wherein the method further comprises:
receiving a first message from another node of the one or more other nodes, over only a first network but not a second network of the at least one external network; and
sending a second message in response to the first message over the first network.

31. The computer readable medium as claimed in claim 28, wherein the method further comprises:
sending a first message, over a first network of the at least one external network, wherein the first message includes a header and a payload, wherein the header includes a value identifying the first node, an indicator of a type of the first message, and an indicator of a length of the payload, and wherein the payload includes a variable number of bytes of information specific to the type of the first message.

32. A first node within a computer system, the first node comprising:
means for interfacing with at least one external network, wherein the at least one external network is to interconnect the first node and one or more other nodes; and
means for processing, to initiate a first state machine for supporting communications over the at least one external network, wherein the communications relate to executing a first application instance of a plurality of application instances in a master-slave configuration, and the means for processing also is to enter a master state for the first application instance if there is a first indication that the first node should be a master of the first application instance, and is to enter a slave state for the first application instance if there is a second indication that a second node already is or is attempting to become the master of the first application instance, the means for processing is to initiate a second state machine for supporting additional messages between the first node and the one or more other nodes, wherein the additional messages relate to executing a second application instance of the plurality of application instances in the master-slave configuration, and wherein states of the first application instance and the second application instance can be different from each other at the first node; and the means for processing also is to initiate an additional state machine for each additional application instance for which the first node will be operating in the master-slave configuration.

33. The first node as claimed in claim 32, wherein the means for interfacing comprises multiple interfaces, and the means for processing also is to receive a first message, over a first interface of the multiple interfaces, from another node of the one or more other nodes, wherein the first message is applicable to an application instance and causes the first node to take a first action, and the means for processing is to receive a second message, over a second interface of the multiple interfaces, wherein the second message is not applicable to a current state of the application instance, and the first node is not to take a second action in response to the second message.

34. The first node as claimed in claim 32, wherein the means for interfacing comprises multiple interfaces, and the means for processing also is to receive a first message from another node of the one or more other nodes, over only a first interface but not a second interface of the multiple interfaces, and the means for processing is to send a second message in response to the first message over the first interface.

35. The first node as claimed in claim 33, wherein the means for processing also is to send a first message, over a first interface of the multiple interfaces, wherein the first message includes a header and a payload, wherein the header includes a value identifying the first node, an indicator of a type of the first message, and an indicator of a length of the payload, and wherein the payload includes a variable number of bytes of information specific to the type of the first message.

\* \* \* \* \*